United States Patent
Ogawa

(10) Patent No.: US 8,167,319 B2
(45) Date of Patent: May 1, 2012

(54) STABILIZER APPARATUS FOR VEHICLE

(75) Inventor: Atsushi Ogawa, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 170 days.

(21) Appl. No.: 12/725,302

(22) Filed: Mar. 16, 2010

(65) Prior Publication Data
US 2010/0253019 A1 Oct. 7, 2010

Related U.S. Application Data

(63) Continuation-in-part of application No. PCT/JP2009/057083, filed on Apr. 6, 2009.

(51) Int. Cl.
*B60G 21/055* (2006.01)
(52) U.S. Cl. .................. 280/5.511; 280/124.106
(58) Field of Classification Search ............... 280/5.511, 280/5.502, 5.506, 5.501, 124.107, 124.106; 74/55, 56
See application file for complete search history.

(56) References Cited

U.S. PATENT DOCUMENTS

| | | | |
|---|---|---|---|
| 4,648,620 A * | 3/1987 | Nuss ............................ | 280/5.511 |
| 5,217,245 A | 6/1993 | Guy | |
| 6,022,030 A * | 2/2000 | Fehring ....................... | 280/5.511 |
| 6,318,737 B1 * | 11/2001 | Marechal et al. ........... | 280/5.511 |
| 6,428,019 B1 * | 8/2002 | Kincad et al. .............. | 280/5.511 |
| 6,513,819 B1 * | 2/2003 | Oliver et al. ............. | 280/124.152 |
| 6,860,167 B2 * | 3/2005 | Schmidt et al. .................... | 74/56 |
| 6,948,707 B2 * | 9/2005 | Gradu ........................... | 267/191 |
| 7,156,406 B2 * | 1/2007 | Kraus et al. ............. | 280/124.107 |
| 7,237,785 B2 * | 7/2007 | Kraus et al. ............. | 280/124.106 |
| 7,270,336 B2 * | 9/2007 | Fujimori ..................... | 280/5.511 |
| 7,494,132 B2 * | 2/2009 | Smay .......................... | 280/5.508 |
| 7,832,739 B2 * | 11/2010 | Pinkos et al. .............. | 280/5.511 |
| 7,909,339 B2 * | 3/2011 | Pinkos et al. .............. | 280/5.511 |
| 2004/0262858 A1 | 12/2004 | Ersoy | |
| 2005/0204835 A1 | 9/2005 | Kraus et al. | |
| 2008/0067863 A1 | 3/2008 | Germain | |

FOREIGN PATENT DOCUMENTS

| | | |
|---|---|---|
| JP | 63-69610 | 5/1988 |
| JP | 1-257614 | 10/1989 |
| JP | 2-083107 | 6/1990 |
| JP | 6-024246 | 6/1994 |
| JP | 3120859 | 10/2000 |
| JP | 2001-105827 | 4/2001 |
| JP | 2005-538329 | 12/2005 |
| JP | 2006-503755 | 2/2006 |
| JP | 2008-68859 | 3/2008 |

* cited by examiner

*Primary Examiner* — Drew Brown
(74) *Attorney, Agent, or Firm* — Oblon, Spivak, McClelland, Maier & Neustadt, L.L.P.

(57) ABSTRACT

A stabilizer apparatus including: (a) torsion bars; (b) a cylinder device including a movable piston and cooperating with the piston to define a fluid chamber accommodating therein a working fluid; and (c) a mechanism configured to hold the piston in a movement end position when the torsion bars are positioned in a neutral angular position, move the piston away from the movement end position when the torsion bars are rotated away from the neutral angular position, and move the piston toward the movement end position when the torsion bars are rotated toward the neutral angular position. The apparatus is capable of switching between a state that allows the piston to be moved in both the opposite directions by allowing outflow and inflow of the working fluid from and into the fluid chamber and another state that allows the piston to be moved only toward the movement end position by allowing only one of the outflow and inflow of the working fluid.

13 Claims, 9 Drawing Sheets

STABILIZER APPARATUS FOR VEHICLE

CROSS-REFERENCE TO RELATED APPLICATIONS

This is a continuation-in-part of PCT application No. PCT/JP2009/057083 filed on Apr. 6, 2009 and designating the United States.

BACKGROUND OF THE INVENTION

1. Field of the Invention

The present invention relates to a vehicle stabilizer apparatus having a pair of torsion bars and capable of switching between a state in which the torsion bars are inhibited from being rotated relative to each other and a state in which the torsion bars are allowed to be rotated relative to each other.

2. Discussion of Related Art

In recent years, there is studied a vehicle stabilizer apparatus as disclosed in patent literatures as identified below, specifically, a stabilizer apparatus capable of switching between a state in which a pair of torsion bars are caused to serve as a stabilizer bar by inhibiting the torsion bars from being rotated from each other and a state in which the torsion bars are not caused to serve as the stabilizer bar by allowing the torsion bars to be rotatable from each other.

[Patent Literature 1] JP-H02-83107U
[Patent Literature 2] JP-H06-24246Y2

SUMMARY OF THE INVENTION

When the pair of torsion bars cooperate to serve as the stabilizer bar, it is possible to effectively restrain roll of a body of a vehicle, owing to a torsional reaction force generated by the pair of torsion bars. However, the torsional reaction force is not required when the vehicle is not turning, for example, when the vehicle is running straight. Rather, when the vehicle is running on a poor-conditioned road, for example, there is a risk that a ride comfort could be made worse by the torsional reaction force. The stabilizer apparatus, which is disclosed in each of the above patent literatures, is capable of switching between the state in which the pair of torsion bars are caused to serve as the stabilizer bar by inhibiting the torsion bars from being rotated from each other and the state in which the pair of torsion bars are not caused to serve as the stabilizer bar by allowing the torsion bars to be rotatable from each other, and is capable of causing the torsion bars to serve as the stabilizer bar when the roll of the vehicle body is required to be restrained.

The pair of torsion bars are designed such that, when the torsion bars serve as the stabilizer bar, the stabilizer bar exhibits a predetermined stiffness in a reference state in which an amount of relative rotation of the torsion bars is zero, namely, in which each of the torsion bars is being positioned in a neutral angular position relative to the other. Therefore, when the relative rotation of the torsion bars is inhibited in a state in which each of the torsion bars is not being positioned in the neutral angular position relative to the other, the stiffness exhibited by the stabilizer bar is different from the predetermined stiffness, thereby causing a risk that an expected roll retraining effect could not be obtained. The present invention was made in the light of the background art discussed above, and has an object of the invention to provide a vehicle stabilizer apparatus capable of switching between a state in which the relative rotation of the torsion bars is inhibited and a state in which the relative rotation of the torsion bars is allowed, and capable of inhibiting the relative rotation of the torsion bars in a state in which each of the torsion bars is being positioned in a neutral angular position relative to the other.

This object may be achieved according to the principle of this invention, which provides a stabilizer apparatus for a vehicle, including: (a) a pair of torsion bars; (b) a cylinder device including a cylinder housing and a piston which is disposed inside the cylinder housing and is movable in an axial direction of the cylinder housing, the cylinder housing and the piston cooperating with each other to define a fluid chamber which accommodates therein a working fluid; (c) a motion converting mechanism configured to convert relative rotation of the torsion bars into movement of the piston inside the cylinder housing, and to hold the piston in a movement end position in the axial direction when each of the torsion bars is being positioned in a neutral angular position relative to the other of the torsion bars, the motion converting mechanism being configured to convert the relative rotation of the torsion bars in a direction away from the neutral angular position, into the movement of the piston in a direction away from the movement end position, and to convert the relative rotation of the torsion bars in a direction toward the neutral angular position, into the movement of the piston in a direction toward the movement end position; (d) a reservoir storing therein the working fluid; and (e) a movement-allowance-state switching mechanism configured to switch between a bidirectional-movement allowance state in which the piston is allowed to be moved in both the opposite directions and an unidirectional-movement allowance state in which the piston is allowed to be moved only in the direction toward the movement end position, the bidirectional-movement allowance state being established by allowing both of outflow of the working fluid from the fluid chamber to the reservoir and inflow of the working fluid from the reservoir to the fluid chamber, the unidirectional-movement allowance state being established by allowing only one of the outflow of the working fluid from the fluid chamber to the reservoir and the inflow of the working fluid from the reservoir to the fluid chamber, wherein each of the torsion bars is allowed to be rotated relative to the other of the torsion bars in both of the opposite directions when the bidirectional-movement allowance state is being established, and is allowed to be rotated relative to the other of the torsion bars only in the direction toward the neutral angular position when the unidirectional-movement allowance state is being established.

In the stabilizer apparatus constructed according to the present invention, each of the torsion bars is allowed to be rotated relative to the other of the torsion bars in both opposite directions, by allowing bidirectional flow of the working fluid between the fluid chamber and the reservoir. Further, each of the torsion bars is allowed to be rotated relative to the other of the torsion bars only in the direction (hereinafter referred to as "neutral-position toward direction" where appropriate) toward the neutral angular position, by allowing only one of the outflow and inflow of the working fluid. Therefore, when each of the torsion bars is not being positioned is the neutral angular position relative to the other, each of the torsion bars is not inhibited from being rotatable relative to the other of the torsion bars in both the opposite directions, even with the unidirectional-movement allowance state being established for causing the torsion bars to serve as the stabilizer bar. Thus, each of the torsion bars becomes close to the neutral angular position relative to the other, by an external force acting in the neutral-position toward direction. The relative rotation of the torsion bars in either of the opposite directions is inhibited only when each of the torsion bars has been rotated to the neutral angular position relative to the other by the external force acting in the neutral-position toward direction. The stabilizer apparatus of the present invention is configured to establish a selected one of a state in which the relative rotation of the torsion bars is inhibited and a state in which the relative rotation of the torsion bars is allowed, wherein the state of inhibition of the relative rotation of the torsion bars can be established in a state in which each of the torsion bars is being positioned in the neutral angular position relative to the other.

VARIOUS MODES OF THE INVENTION

There will be described various modes of the invention (hereinafter referred to as "claimable invention" where appropriate) deemed to contain claimable features for which protection is sought. Each of these modes of the invention is numbered like the appended claims and depends from the other mode or modes, where appropriate, for easier understanding of the technical features disclosed in the present specification. It is to be understood that the claimable invention is not limited to the technical features or any combinations thereof which will be described in each of these modes. That is, the scope of the claimable invention should be interpreted in the light of the following descriptions accompanying the various modes and preferred embodiment of the invention. In a limit in accordance with such an interpretation, a mode of the claimable invention can be constituted by not only any one of these modes but also either a mode provided by any one of these modes and additional component or components incorporated therein and a mode provided by any one of these modes without some of components recited therein. In the following modes, mode (1) corresponds to claim 1; claim 1 to which technical features described in mode (2) are added corresponds to claim 2; claim 1 to which technical features described in mode (3) are added corresponds to claim 3; any one of claims 1 through 3 to which technical features described in mode (4) are added corresponds to claim 4; claim 4 to which technical features described in mode (5) are added corresponds to claim 5; any one of claims 1 through 3 to which technical features described in mode (7) are added corresponds to claim 6; claim 6 to which technical features described in mode (8) are added corresponds to claim 7; any one of claims 1 through 7 to which technical features described in mode (9) are added corresponds to claim 8; any one of claims 1 through 8 to which technical features described in mode (13) are added corresponds to claim 9; any one of claims 1 through 9 to which technical features described in mode (14) are added corresponds to claim 10; any one of claims 1 through 10 to which technical features described in mode (15) are added corresponds to claim 11; any one of claims 1 through 11 to which technical features described in mode (16) are added corresponds to claim 12; and any one of claims 1 through 12 to which technical features described in mode (18) are added corresponds to claim 13.

(1) A stabilizer apparatus for a vehicle, including:

(a) a pair of torsion bars each of which is held by a body of the vehicle and is rotatable about an axis thereof, each of the torsion bars being provided for a corresponding one of right and left wheels and extending generally in a lateral direction of the vehicle, each of the torsion bars including a distal end portion connected to a wheel holding portion that holds a corresponding one of the right and left wheels, the torsion bars being configured to serve as a stabilizer bar in a state in which relative rotation of each of the torsion bars relative to the other of the torsion bars is inhibited;

(b) a cylinder device including a cylinder housing and a piston which is disposed inside the cylinder housing and is movable in an axial direction of the cylinder housing, the cylinder housing and the piston cooperating with each other to define a fluid chamber which accommodates therein a working fluid and which has a volume that is to be changed by movement of the piston inside the cylinder housing;

(c) a motion converting mechanism configured to convert the relative rotation of each of the torsion bars into the movement of the piston inside the cylinder housing, and to hold the piston in a movement end position in the axial direction when each of the torsion bars is being positioned in a neutral angular position relative to the other of the torsion bars, the motion converting mechanism being configured to convert the relative rotation of each of the torsion bars in a direction away from the neutral angular position, into the movement of the piston in a direction away from the movement end position, and to convert the relative rotation of each of the torsion bars in a direction toward the neutral angular position, into the movement of the piston in a direction toward the movement end position;

(d) a reservoir held in communication with the fluid chamber and storing therein the working fluid; and (e) a movement-allowance-state switching mechanism configured to switch between a bidirectional-movement allowance state in which the piston is allowed to be moved in opposite directions consisting of the direction toward the movement end position and the direction away from the movement end position and an unidirectional-movement allowance state in which the piston is allowed to be moved only in the direction toward the movement end position, the bidirectional-movement allowance state being established by allowing both of outflow of the working fluid from the fluid chamber to the reservoir and inflow of the working fluid from the reservoir to the fluid chamber, the unidirectional-movement allowance state being established by allowing only one of the outflow of the working fluid from the fluid chamber to the reservoir and the inflow of the working fluid from the reservoir to the fluid chamber, wherein each of the torsion bars is allowed to be rotated relative to the other of the torsion bars in the direction toward the neutral angular position and in the direction away from the neutral angular position when the bidirectional-movement allowance state is being established, and is allowed to be rotated relative to the other of the torsion bars only in the direction toward the neutral angular position when the unidirectional-movement allowance state is being established.

In a vehicle stabilizer apparatus having a pair of torsion bars and capable of switching between a state in which relative rotation of the torsion bars is inhibited and a state in which the relative rotation of the torsion bars is allowed, it is possible to effectively restrain roll of the vehicle body by a torsional reaction force generated by the pair of torsion bars which are caused to serve as a stabilizer bar. However, the torsional reaction force is not required, for example, when the vehicle is running straight. Rather, when the vehicle is running on a poor-conditioned road, for example, there is a risk that a ride comfort could be made worse by the torsional reaction force. In view of this, it might be possible to adapt the apparatus, such that the relative rotation of the torsion bars is inhibited in a case in which the torsional reaction force is required to be generated by the torsion bars, and such that the relative rotation of the torsion bars is allowed whereby the torsion bars are caused to not serve as the stabilizer bar in the other case.

However, the pair of torsion bars are designed such that, when the torsion bars serve as the stabilizer bar, the stabilizer bar exhibits a predetermined stiffness in a reference state in which an amount of relative rotation of the torsion bars is zero, namely, in which each of the torsion bars is being positioned in the neutral angular position relative to the other. Therefore, when the relative rotation of the torsion bars is inhibited in a state in which each of the torsion bars is not being positioned in the neutral angular position relative to the other, the stiffness exhibited by the stabilizer bar is different from the predetermined stiffness. That is, when the relative rotation of the torsion bars is inhibited with each of the torsion bars being not positioned in the neutral angular position relative to the other, there is a risk that an expected roll retraining effect could not be obtained.

In view of above, the vehicle stabilizer apparatus described in the present mode is constructed to be capable of switching between a state in which each of the torsion bars is allowed to be rotated relative to the other in both opposite directions and a state in which each of the torsion bars is allowed to be rotated relative to the other only in the direction (hereinafter referred to as "neutral-position toward direction" where appropriate) toward the neutral angular position. When each of the torsion bars is not being positioned in the neutral angular position relative to the other in the state in which each of the torsion bars is allowed to be rotated relative to the other only in the neutral-position toward direction, each of the torsion bars becomes closer to the neutral angular position relative to the other, by an external force which is applied to at least one of the torsion bars and which acts on the neutral-position toward direction. Then, each of the torsion bars is eventually inhibited from being rotated relative to the other in both the opposite directions when each of the torsion bars has been rotated to the neutral angular position relative to the other by the external force acting in the neutral-position toward direction. Therefore, the stabilizer apparatus described in the present mode is capable of switching between a state in which the relative rotation of the torsion bars is inhibited and a state in which the relative rotation of the torsion bars is allowed, wherein the state of inhibition of the relative rotation of the torsion bars can be established in a state in which each of the torsion bars is being positioned in the neutral angular position relative to the other.

The term "neutral angular position", which is described in the present mode, is an angular position of each of the torsion bars relative to the other in a state in which an amount of rotation of each of the torsion bars relative to the other is zero or in a state in which the vehicle is stationary on a flat road. Each of the torsion bars is rotatable relative to the other from the neutral angular position in both the opposite directions, and the neutral angular position is located substantially in a center of a range through which each of the torsion bars is rotatable relative to the other. Further, the term "movement end position", which is recited in the present mode, is a position of the piston when the piston is being positioned in an end of a range through which the piston is movable by the relative rotation of the torsion bars. The piston can be moved to the movement end position by the relative rotation of the torsion bars, and cannot be further moved to pass the movement end position.

(2) The stabilizer apparatus according to mode (1), wherein the motion converting mechanism is configured to maximize the volume of the fluid chamber when the piston is being positioned in the movement end position, and wherein the movement-allowance-state switching mechanism is configured to allow only the inflow of the working fluid from the reservoir to the fluid chamber when the unidirectional-movement allowance state is being established by the movement-allowance-state switching mechanism.

(3) The stabilizer apparatus according to mode (1), wherein the motion converting mechanism is configured to minimize the volume of the fluid chamber when the piston is being positioned in the movement end position, and wherein the movement-allowance-state switching mechanism is configured to allow only the outflow of the working fluid from the fluid chamber to the reservoir when the unidirectional-movement allowance state is being established by the movement-allowance-state switching mechanism.

In the stabilizer apparatus described in each of the above two modes, there is a specific limitation regarding flow of the working fluid between the fluid chamber and the reservoir in the unidirectional-movement allowance state. In the apparatus described in the former mode, only the inflow of the working fluid to the fluid chamber is allowed to maximize the volume of the fluid chamber for thereby positioning the piston in the movement end position, when the unidirectional-movement allowance state is being established. On the other hand, in the apparatus described in the latter mode, only the outflow of the working fluid from the fluid chamber is allowed to minimize the volume of the fluid chamber for thereby positioning the piston in the movement end position, when the unidirectional-movement allowance state is being established.

(4) The stabilizer apparatus according to any one of modes (1)-(3), wherein the cylinder housing extends in the lateral direction of the vehicle, and is connected at one of opposite end portions thereof to a proximal end portion of one of the torsion bars such that the cylinder housing is unrotatable relative to the one of the torsion bars, and wherein the motion converting mechanism includes (c-i) a cam which is connected to the other of the torsion bars such that the cam is to be rotated by rotation of the other of the torsion bars about the axis thereof, and (c-ii) a cam follower which is connected to the piston such that the cam follower is unmovable relative to the piston in the axial direction, the cam follower being configured to follow the cam, such that the cam follower is moved in the axial direction by rotation of the cam, whereby the relative rotation of each of the torsion bars relative to the other of the torsion bars, is converted into the movement of the piston inside the cylinder housing.

In the stabilizer apparatus described in the present mode, there is a specific limitation regarding construction of the motion converting mechanism. By employing a cam mechanism as the motion converting mechanism, it is possible to convert a rotational motion into a straight linear motion through a relatively simple construction. Therefore, in the apparatus described in the present mode, the construction of the motion converting mechanism can be made simple. The "cam follower" described in the present mode may have any construction that enables the cam follower to follow movement of the cam. For example, where the cam has a groove by means of which the cam is followed by the cam follower, the cam follower may be a pin or any other construction that is engaged with a wall of the groove. On the other hand, where the cam has a pin or the like, the cam follower may be constructed to have a groove to which the pin is engaged. Further, the cam follower, which is connected to the piston unmovably relative to the piston in the axial direction of the cylinder device, may be connected directly to the piston or may be connected to the position via a piston rod or the like.

(5) The stabilizer apparatus according to mode (4), wherein the motion converting mechanism includes (c-i) a hollow cylindrical member which is fitted to the other of the opposite end portions of the cylinder housing such that the cylindrical member is rotatable and unmovable in the axial direction relative to the cylinder housing, and is connected to a proximal end portion of the other of the torsion bars such that the cylindrical member is unrotatable relative to the other of the torsion bars, the cylindrical member having a slot which is provided in an inner wall surface of the cylindrical member and which has a V-shape that is symmetrical with respect to a plane containing an axis of the cylindrical member, and (c-ii) a pin which is engaged in the slot, the pin being connected to the piston such that the pin is unmovable relative to the piston in the axial direction, and wherein the cylindrical member serves as the cam while the pin serves as the cam follower.

In the stabilizer apparatus described in the present mode, there are specific limitations regarding the cam and cam follower. In the apparatus described in the present mode, it is preferable that each of the torsion bars is being positioned in the neutral angular position relative to the other when the pin is being engaged in a central portion of the V-shaped slot, i.e., a portion of the slot from which two forked portions extend, so that it is possible to position the piston in the movement end position when each of the torsion bars is being positioned in the neutral angular position relative to the other. Further, it is possible to covert the relative rotation of each of the torsion bars in a direction (hereinafter referred to as "neutral-position away direction") away from the neutral angular position, into the movement of the piston in a direction (hereinafter referred to as "movement-end-position away direction") away from the movement end position, and to convert the relative rotation of each of the torsion bars in the neutral-position toward direction, into the movement of the piston in a direction (hereinafter referred to as "movement-end-position toward direction") toward the movement end position.

The "slot" described in the present mode, which is provided at least in the inner wall surface of the cylindrical member, may be provided to penetrate from the inner wall surface to an outer wall surface of the cylindrical member. Further, the "pin" described in the present mode, which is connected to the piston unmovably relative to the piston in the axial direction of the cylinder device, may be connected directly to the piston or may be connected to the position via a piston rod or the like.

(6) The stabilizer apparatus according to mode (5), wherein the cylinder device has a piston rod which is connected at one of opposite end portions thereof to the piston and which includes a projecting portion projecting out from the other of the opposite end portions of the cylinder housing, the projecting portion being provided by the other of the opposite end portions of the piston rod, and wherein the pin is provided on the projecting portion of the piston rod.

In the stabilizer apparatus described in the present mode, it is possible to appropriately convert pivot motion of the cam into the movement of the piston within the cylinder housing.

(7) The stabilizer apparatus according to any one of modes (1)-(3), wherein the cylinder device has a piston rod which is connected at one of opposite end portions thereof to the piston and which includes a projecting portion projecting out from one of opposite end portions of the cylinder housing, the projecting portion being provided by the other of the opposite end portions of the piston rod, the cylinder device being caused to expand and contract by movement of the piston inside the cylinder housing, wherein the motion converting mechanism has (c-A) a first supporting portion which is integrated with a proximal end portion of one of the torsion bars and which includes a radially distant portion that is radially distant from the axis of the one of the torsion bars, the radially distant portion of the first supporting portion supporting the other of the opposite end portions of the cylinder housing such that the cylinder housing is pivotable relative to the first supporting portion and (c-B) a second supporting portion which is integrated with a proximal end portion of the other of the torsion bars and which includes a radially distant portion that is radially distant from the axis of the other of the torsion bars, the radially distant portion of the second supporting portion supporting the other of the opposite end portions of the piston rod such that the piston rod is pivotable relative to the second supporting portion, and wherein the motion converting mechanism is configured to convert the relative rotation of each of the torsion bars into the movement of the piston inside the cylinder housing, by causing the cylinder device to expand and contract by change of distance between the first and second supporting portions which is caused by the relative rotation of each of the torsion bars, the motion converting mechanism being configured, when each of the torsion bars is being positioned in the neutral angular position relative to the other of the torsion bars, to place the cylinder device in one of a maximum expansion state in which expansion of the cylinder device is maximized and a maximum contraction state in which contraction of the cylinder device is maximized.

In the stabilizer apparatus described in the present mode, there is a specific limitation regarding construction of the motion converting mechanism. Each of the "first supporting portion" and "second supporting portion" described in the present mode is disposed to be generally eccentric with respect to a corresponding one of the torsion bars, so that the first and second supporting portions are moved toward or away from each other by the relative rotation of the torsion bars whereby the cylinder device supported by the first and second supporting portions is caused to expand and contract by the relative rotation of the torsion bars. Therefore, in the apparatus described in the present mode, it is possible to appropriately convert the relative rotation of the torsion bars into the movement of the piston inside the cylinder housing.

Further, in the apparatus described in the present mode, the expansion or contraction of the cylinder device is maximized in a state in which each of the torsion bars is being positioned in the neutral angular position relative to the other, so that the piston is being positioned in the movement end position when the expansion or contraction of the cylinder device is maximized. The piston is moved in the movement-end-position away direction, when each of the torsion bars is rotated from the neutral angular position relative to the other in any one of the opposite directions. Therefore, in the apparatus described in the present mode, it is possible to convert the relative rotation of each of the torsion bars in the neutral-position away direction relative to the other, into the movement of the piston in the movement-end-position away direction, and to convert the relative rotation of each of the torsion bars in the neutral-position toward direction relative to the other, into the movement of the piston in the movement-end-position toward direction. Further, each of the "first supporting portion" and "second supporting portion" may be constructed to support directly a corresponding one of opposite end portions of the cylinder device, or may be constructed to support the corresponding one of the opposite end portions of the cylinder device via an additional member.

(8) The stabilizer apparatus according to mode (7), wherein the torsion bars are rotatable relative to each other about a common axis as the axis, and wherein the motion converting mechanism is configured, when each of the torsion bars is being positioned in the neutral angular position relative to the other of the torsion bars, to cause the radially distant portion of the first supporting portion and the radially distant portion of the second supporting portion to lie on a plane containing the common axis and to cause the radially distant portion of the first supporting portion and the radially distant portion of the second supporting portion to be positioned in respective opposite sides of the common axis.

In the stabilizer apparatus described in the present mode, there is a specific limitation regarding positions of the respective first and second supporting portions in a state in which each of the torsion bars is being positioned in the neutral angular position relative to the other. In the apparatus described in the present mode, a distance between the positions of the respective first and second supporting portions is maximized in the state in which each of the torsion bars is being positioned in the neutral angular position relative to the other. Thus, in the apparatus described in the present mode, it is possible to maximize the expansion of the cylinder device in the state in which each of the torsion bars is being positioned in the neutral angular position relative to the other.

(9) The stabilizer apparatus according to any one of modes (1)-(8), wherein the movement-allowance-state switching mechanism has (e-i) a bidirectional-flow allowing passage configured to allow both of the outflow of the working fluid from the fluid chamber to the reservoir and the inflow of the working fluid from the reservoir to the fluid chamber, (e-ii) an unidirectional-flow allowing passage configured to allow only one of the outflow of the working fluid from the fluid chamber to the reservoir and the inflow of the working fluid from the reservoir to the fluid chamber, and (e-iii) a flowing-state switching device configured to switch between a state in which the working fluid is allowed to flow between the fluid chamber and the reservoir through the bidirectional-flow allowing passage and a state in which the working fluid is allowed to flow between the fluid chamber and the reservoir through the unidirectional-flow allowing passage.

(10) The stabilizer apparatus according to any one of modes (1)-(8), wherein the movement-allowance-state switching mechanism has (e-i) a communication passage configured to communicate between the fluid chamber and the reservoir so as to enable the working fluid to flow therethrough between the fluid chamber and the reservoir, (e-ii) a closing/opening valve disposed in the communication passage and configured to close and open the communication passage, for thereby switching between a state in which the working fluid is inhibited from flowing through the communication passage and a state in which the working fluid is allowed to flow through the communication passage, and (e-iii) a bypass passage bypassing the closing/opening valve and communicating between the fluid chamber and the reservoir, the bypass passage being configured to allow only one of the outflow of the working fluid from the fluid chamber to the reservoir and the inflow of the working fluid from the reservoir to the fluid chamber.

(11) The stabilizer apparatus according to any one of modes (1)-(8), wherein the movement-allowance-state switching mechanism has (e-i) a communication passage configured to communicate between the fluid chamber and the reservoir so as to enable the working fluid to flow therethrough between the fluid chamber and the reservoir and (e-ii) a flowing-state switching valve disposed in the communication passage and configured to switch between a state that allows only one of the outflow of the working fluid from the fluid chamber to the reservoir and the inflow of the working fluid from the reservoir to the fluid chamber and a state that allows both of the outflow of the working fluid from the fluid chamber to the reservoir and the inflow of the working fluid from the reservoir to the fluid chamber.

(12) The stabilizer apparatus according to any one of modes (1)-(8), wherein the movement-allowance-state switching mechanism has (e-i) a first communication passage configured to communicate between the fluid chamber and the reservoir so as to enable the working fluid to flow therethrough between the fluid chamber and the reservoir, (e-ii) a second communication passage configured to communicate between the fluid chamber and the reservoir and to allow only one of the outflow of the working fluid from the fluid chamber to the reservoir and the inflow of the working fluid from the reservoir to the fluid chamber, and (e-iii) a communication-passage switching valve configured to switch between the first and second communication passages so as to select one of the first and second communication passages such that the fluid chamber and the reservoir are held in communication with each other through the selected one of the first and second communication passages.

In the stabilizer apparatus described in each of the above four modes, there is a specific limitation regarding construction of the movement-allowance-state switching mechanism. In the apparatus described in each of the above four modes, the state of flow of the working fluid between the fluid chamber and the reservoir can be easily switched between the unidirectional-movement allowance state and the bidirectional-movement allowance state.

(13) The stabilizer apparatus according to any one of modes (1)-(12),
wherein the cylinder device has two chambers that are defined by cooperation of the piston with the cylinder housing,
and wherein one of the two chambers serves as the fluid chamber while the other of the two chambers serves as the reservoir.

In the stabilizer apparatus described in the present mode, since the reservoir is provided inside the cylinder device, for example, a valve (such as a closing/opening valve) and a communication passage configured to communicate between the fluid chamber and the reservoir can be provided inside the cylinder device. Therefore, in the apparatus described in the present mode, it is possible to simply construct the apparatus.

(14) The stabilizer apparatus according to any one of modes (1)-(13), further comprising an accumulator that is connected to the fluid chamber.

When the pair of torsion bars is caused to serve as the stabilizer bar by inhibiting the relative rotation of the torsion bars, a torsional reaction force generated by the pair of torsion bars acts as a roll restraining force against roll of the vehicle body. In the apparatus described in the present mode, since the accumulator is connected to the fluid chamber, a pressure force accumulated by the accumulator also acts as the roll restraining force when the torsion bars serve as the stabilizer bar. Therefore, in the apparatus described in the present mode, the pressure force accumulated in the accumulator as well as the torsional reaction force generated by the torsion bars is caused to serve as the roll restraining force, so that it is possible to finely adjust a roll stiffness of the vehicle body by adjusting a spring constant of the accumulator.

(15) The stabilizer apparatus according to any one of modes (1)-(14),
wherein the motion converting mechanism has a communication passage configured to communicate between the fluid chamber and the reservoir so as to enable the working fluid to flow therethrough between the fluid chamber and the reservoir, the stabilizer apparatus further comprising a flow resistor which is disposed in the communication passage and is configured to apply a flow resistance force to flow of the working fluid between the fluid chamber and the reservoir, the stabilizer apparatus being configured to generate a rotation resistance force acting against the relative rotation of each of the torsion bars relative to the other of the torsion bars, by causing the flow resistor to generate the flow resistance force acting against the flow of the working fluid through the communication passage which is caused by the movement of the piston inside the cylinder housing.

In the stabilizer apparatus described in the present mode, since the resistance force is generated to act against the relative rotation of the torsion bars, the resistance force acts as a damping force against roll vibration of the vehicle body. Therefore, in the apparatus described in the present mode, it is possible to damp the roll vibration in the state in which each of the torsion bars is allowed to be rotated relative to the other.

(16) The stabilizer apparatus according to any one of modes (1)-(15), wherein each of the torsion bars includes (a-1) a shaft portion which extends in the lateral direction of the vehicle and (a-2) an arm portion which is contiguous to the shaft portion and which extends in a direction intersecting the shaft portion, the arm portion being connected at a distal end portion thereof to the wheel holding portion that holds a corresponding one of the right and left wheels.

In the stabilizer apparatus described in the present mode, there is a specific limitation regarding the construction of the torsion bars. The "torsion bar" described in the present mode may be constituted either by two pieces which constitute the respective shaft portion and arm portion and which are connected to each other, or by a single piece which is formed to constitute both of the shaft portion and arm portion.

(17) The stabilizer apparatus according to mode (16), wherein each of the torsion bars is being positioned in the neutral angular position relative to the other of the torsion bars when the distal end portion of the arm portion of one of the torsion bars and the distal end portion of the arm portion of the other of the torsion bars are being positioned in the same height position without twisting deformation of each of the torsion bars.

(18) The stabilizer apparatus according to any one of modes (1)-(16), wherein each of the torsion bars is being positioned in the neutral angular position relative to the other of the torsion bars when the vehicle is stationary on a flat road without twisting deformation of each of the torsion bars.

In the stabilizer apparatus described in each of the above two modes, there is a limitation regarding the neutral angular position of each of the torsion bars relative to the other. In the apparatus described in each of the above two modes, it is possible to cause the amount of the relative rotation of the torsion bars to be zero in the state in which each of the torsion bars is being positioned in the neutral angular position relative to the other.

DETAILED DESCRIPTION OF THE PREFERRED EMBODIMENTS

There will be described some embodiments of the claimable invention and a modification of one of the embodiments, by reference to the accompanying drawings. It is to be understood that the present claimable invention is not limited to the following embodiments and modification, and may be otherwise embodied with various changes and modifications, such as those described in the foregoing "MODES OF THE INVENTION", which would be based on knowledge of those skilled in the art.

First Embodiment

Figure 1:
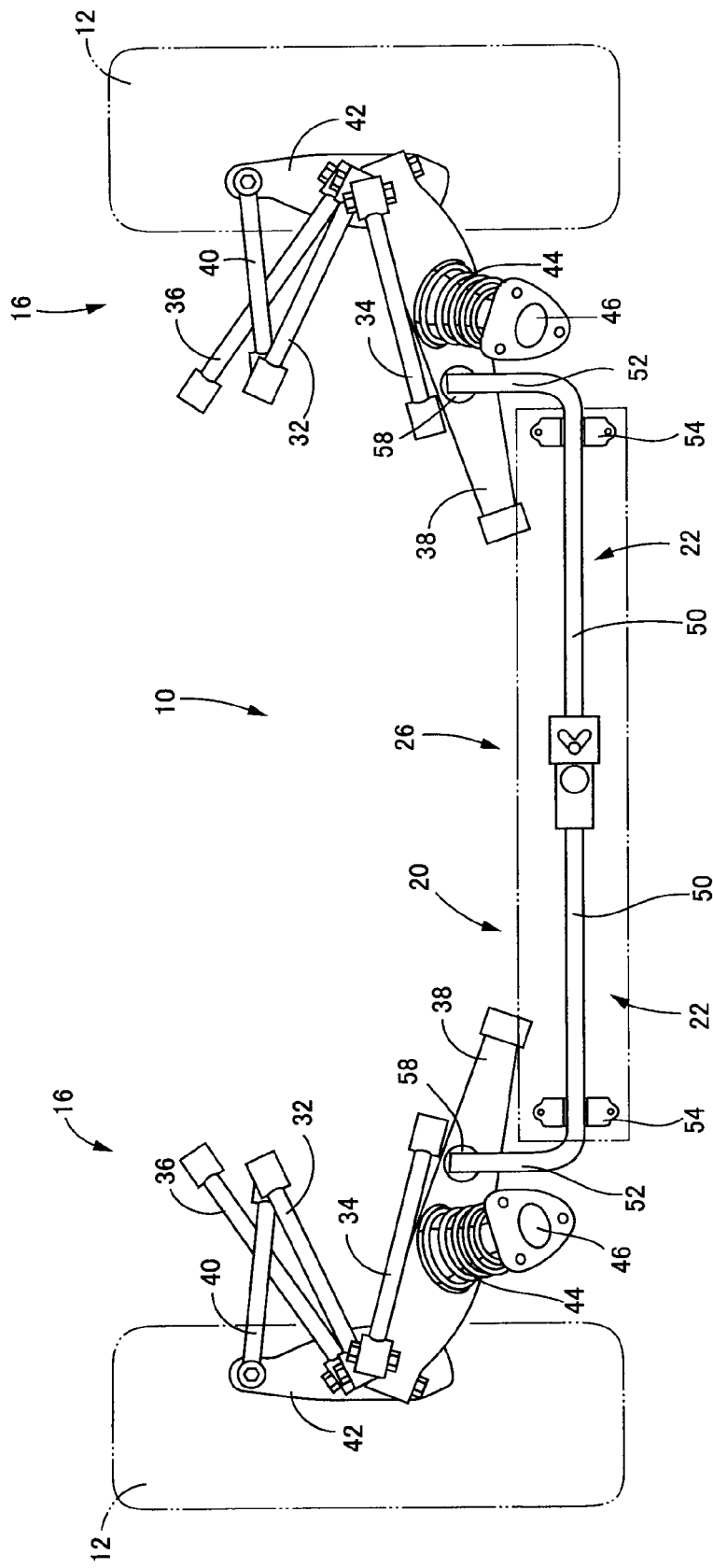
FIG. 1 is a schematic view showing a stabilizer apparatus for a vehicle, which is constructed according to a first embodiment of the claimable invention, as seen from an upper side of the vehicle.
Figure 2:
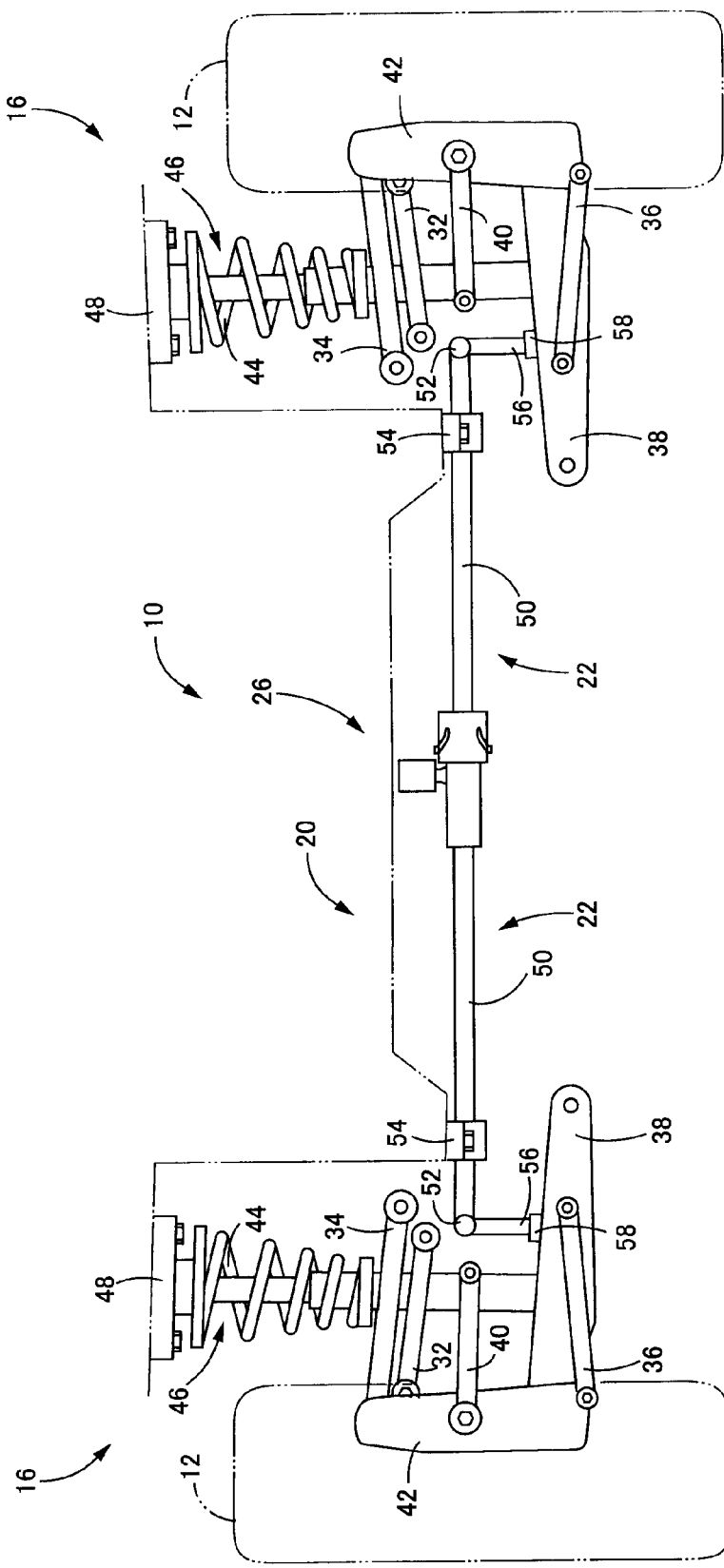
FIG. 2 is a schematic view showing the stabilizer apparatus which is constructed according to the first embodiment of the claimable invention, as seen from a front side of the vehicle.

FIGS. 1 and 2 show a stabilizer apparatus 10 for a vehicle. FIG. 1 is a view of the stabilizer apparatus 10 as seen from an upper side of the vehicle. FIG. 2 is a view of the stabilizer apparatus as seen from a front side of the vehicle. The stabilizer apparatus 10 includes a stabilizer bar 20 connected at its respective opposite end portions to suspension devices 16 that are provided for respective right and left wheels 12 of the vehicle. The stabilizer bar 20 includes a pair of torsion bars in the form of a pair of stabilizer bar members 22 into which the stabilizer bar 20 is divided. The stabilizer bar members 22 are connected to each other through an interconnecting mechanism 26, rotatably relative to each other.

Each of the suspension devices 16 is a multi-link suspension, and is equipped with an arm assembly that includes a total of five suspension arms for holding a corresponding one of the wheels. The five suspension arms consist of a first upper arm 32, a second upper arm 34, a first lower arm 36, a second lower arm 38 and a toe control arm 40. Each of the five suspension arms 32, 34, 36, 38, 40 is connected at one of its longitudinal end portions to the vehicle body, pivotably relative to the vehicle body, and is connected at the other longitudinal end portion to an axle carrier 42 by which the wheel is rotatably held. Owing to its connection with the five suspension arms 32, 34, 36, 38, 40, the axle carrier 42 is vertically displaceable relative to the vehicle body along a substantially constant locus.

Each suspension device 16 includes a coil spring 44 and a hydraulic shock absorber 46 which are disposed in parallel with each other between the above-described second lower arm 38 and a mount portion 48 that is disposed in a tire housing. That is, each suspension device 20 is configured to generate a damping force for absorbing vibrations caused by displacement of the wheel 12 and the vehicle body toward and away from each other, while elastically interconnecting the wheel 12 and the vehicle body.

Each of the stabilizer bar members 22 of the stabilizer apparatus 10 may be considered to be sectioned into a shaft portion 50 and an arm portion 52 that is integrated with the shaft portion 50. The shaft portion 50 extends generally in a lateral direction of the vehicle, while the arm portion 52 extends generally in a forward direction of the vehicle which intersects the shaft portion 50. The shaft portion 50 of each of the stabilizer bar members 22 is rotatably held, at its portion that is close to the arm portion 52, by a retainer 54 that is fixed to the vehicle body, such that the shaft portions 50 of the respective bar members 22 are held coaxial with each other. The shaft portion 50 of each of the stabilizer bar members 22 is connected at its end portion (i.e., one of its opposite end portions that is remote from the arm portion 52) to the interconnecting mechanism 26, as described later in detail. On the other hand, the arm portion 52 is connected at its end portion (i.e., one of its opposite end portions that is remote from the shaft portion 50) to the second lower arm 38 (as a wheel holding member holding the wheel 12) via a link rod 56. A link-rod connecting portion 58 is provided on the second lower arm 38, so that the link rod 56 is rockably connected at one and the other of its opposite end portions to the link-rod connecting portion 58 and the arm portion 52 of a corresponding one of the stabilizer bar members 22, respectively.

Figure 3:
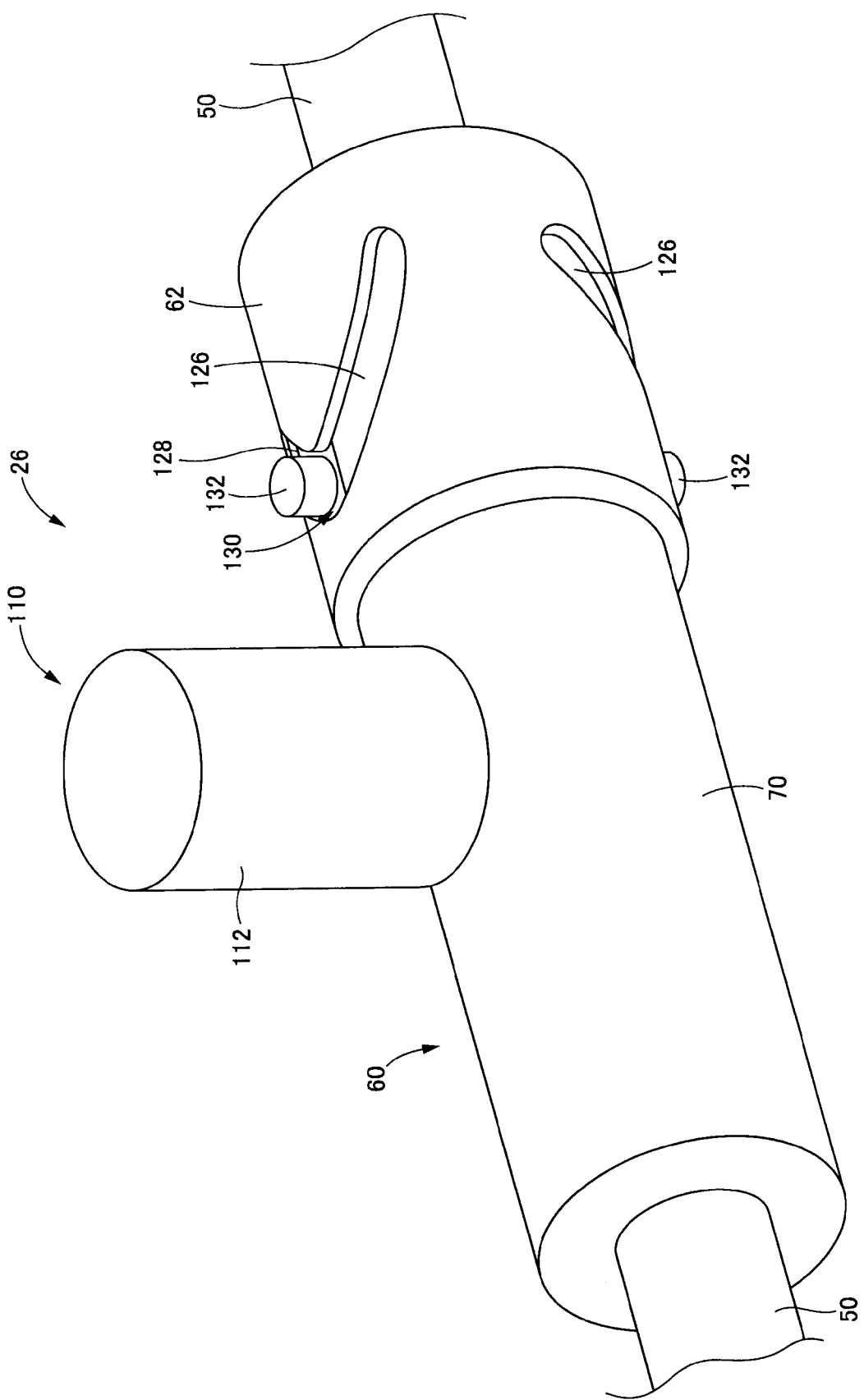
FIG. 3 is a perspective view showing an interconnecting mechanism that is included in the stabilizer apparatus shown in FIGS. 1 and 2.
Figure 4:
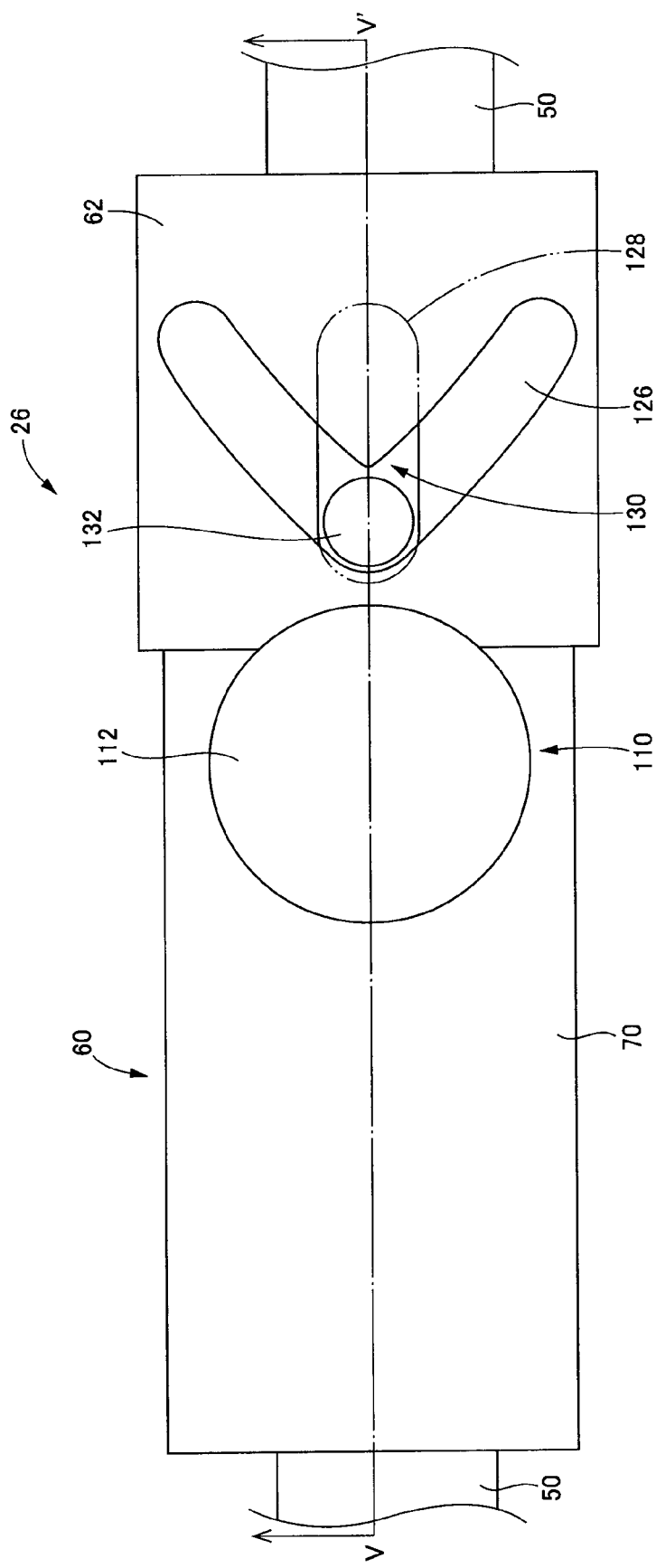
FIG. 4 is an enlarged schematic view showing the interconnecting mechanism that is included in the stabilizer apparatus shown in FIGS. 1 and 2, as seen from an upper side of the vehicle.

As shown in FIGS. 3 and 4, the interconnecting mechanism 26 of the stabilizer apparatus 10 is constructed to include: a cylinder device 60 that is fixedly connected to an end portion of the shaft portion 50 of one of the stabilizer bar members 22; and a cylindrical member 62 which has a bottom wall and which is fixedly connected to an end portion of the shaft portion 50 of the other of the stabilizer bar members 22. The cylinder device 60 is disposed to be coaxial with the shaft portion 50 of the one of the stabilizer bar members 22, and is fixed at its end portion to the end portion of the shaft portion 50 of the one of the stabilizer bar members 22. Meanwhile, the cylindrical member 62 is disposed to be coaxial with the shaft portion 50 of the other of the stabilizer bar members 22, and is fixed at its bottom wall to the end portion of the shaft portion 50 of the other of the stabilizer bar members 22. The cylinder device 60 is fitted, at its another end portion, in an end portion of the cylindrical member 62 which is remote from the bottom wall, such that the cylinder device 60 is rotatable relative to the cylindrical member 62. Owing to such a construction, the interconnecting mechanism 26 interconnects the pair of stabilizer bar members 22 such that the stabilizer bar members 22 are rotatable relative to each other.

Figure 5:
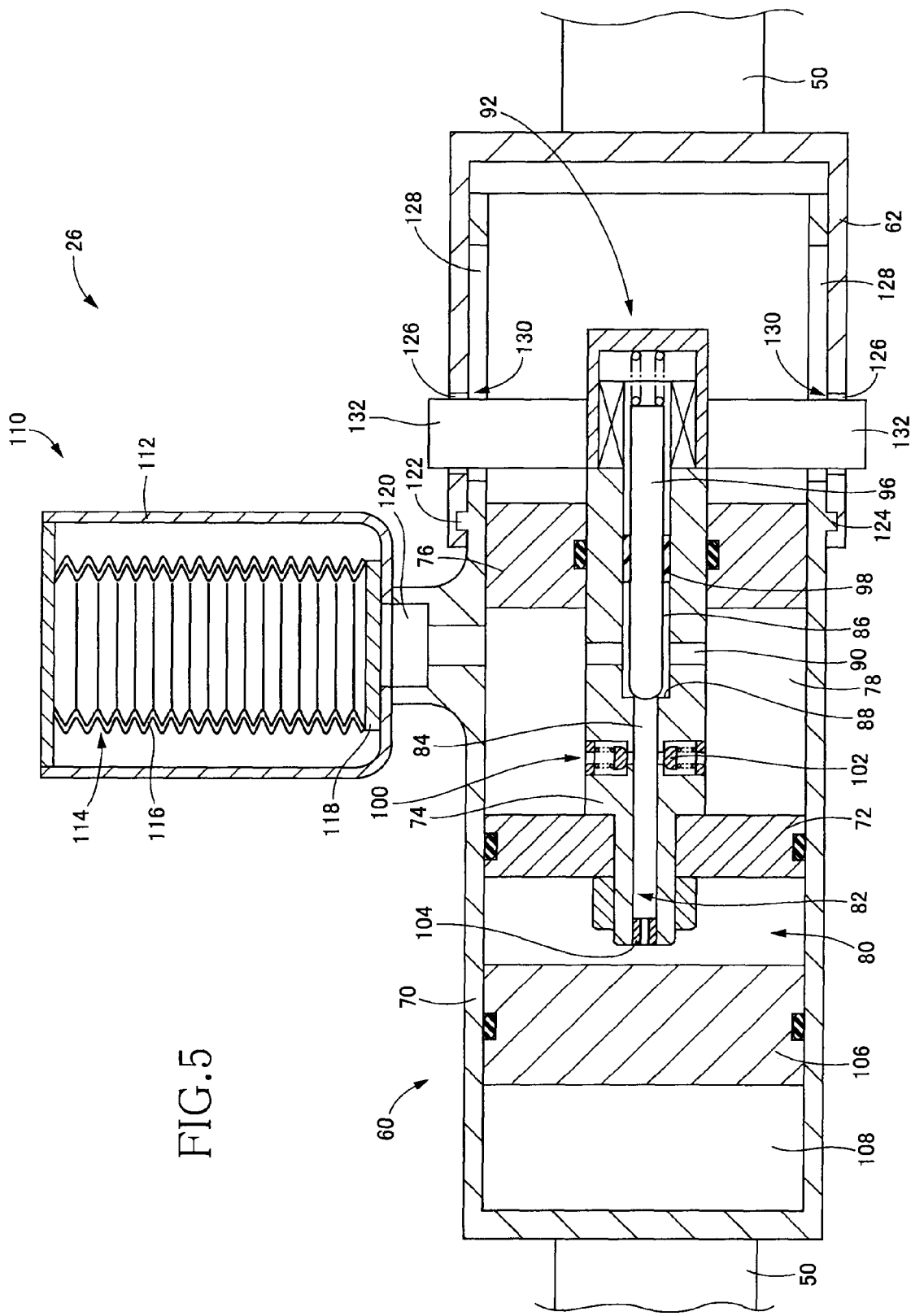
FIG. 5 is a cross sectional view taken along line V-V' in FIG. 4.

As shown in FIG. 5, the cylinder device 60 includes: a generally tubular-shaped cylinder housing 70 which is connected to the shaft portion 50 of the one of the stabilizer bar members 22 and which accommodates therein a working fluid; a piston 72 which is fluid-tightly and slidably fitted inside the cylinder housing 70; and a piston rod 74 which is connected at one of its opposite end portions to the piston 72 and which includes a projecting portion projecting out from the cylinder housing 70. The projecting portion of the piston rod 74 is provided by the other of the opposite end portions of the piston rod 74. The piston rod 74 pierces through a cap portion 76 that is disposed in the cylinder housing 70, and is in slidable contact with the cap portion 76 via a seal. An inner space of the cylinder housing 70 is divided by the piston 72, into two chambers consisting of a first chamber 78 and a second chamber 80. The first chamber 78 is located between the piston 72 and the cap portion 76, while the second chamber 80 is located between the piston 72 and a bottom wall of the cylinder housing 70.

The piston rod 74 is a hollow-shaped rod, and has a through-hole 82 extending through the piston rod 74. The through-hole 82 has a small diameter portion 84 and a large diameter portion 86. The small diameter portion 84 opens toward the second chamber 80 of the inner space of the cylinder housing 70. The large diameter portion 86 is contiguous to the small diameter portion 84, and extends in an axial direction of the cylinder housing 70. A stepped surface 88 is provided in a boundary between the small diameter portion 84 and large diameter portion 86 of the through-hole 82. The piston rod 74 has connection passages 90 connecting between the first chamber 78 and the large diameter portion 86 of the through-hole 82. The connection passages 90 are configured to cooperates with the through-hole 82 to communicate between the first and second chambers 78, 80 so as to enable the working fluid to flow through the connection passages 90 and through-hole 82 between the first and second chambers 78, 80.

The projecting portion of the piston rod 74, which projects from the cap portion 76 of the cylinder housing 70 of the piston rod 74, is provided with a solenoid 92 and a rod 96 that cooperate with each other to serve as a closing/opening valve. The rod 96 is introduced in the large diameter portion 86 of the through-hole 82, and is movable in the axial direction. When the solenoid 92 is being placed in its deenergized state, a distal end portion of the rod 96 is in contact with the stepped portion 88 owing to force of a spring so that the through-hole 82 is closed, as shown in FIG. 5, whereby the working fluid is inhibited from flowing between the first and second chambers 78, 80 through the connection passages 90. On the other hand, when the solenoid 92 is being placed in its energized state, the distal end portion of the rod 96 is separated from the stepped surface 88 of the through-hole 82, whereby the working fluid is allowed to flow between the first and second chambers 78, 80 through the through-hole 82 and connecting passages 90 which serve as a communication passage. A seal 98 is provided in the large diameter portion 86 of the through-hole 82. This seal 98 is interposed between an inner circumferential surface of the through-hole 82 and an outer circumferential surface of the rod 96, for thereby avoiding outflow of the working fluid toward the solenoid 92.

The piston rod 74 has second connection passages 100 connecting between the first chamber 78 and the small diameter portion 84 of the through-hole 82. A check valve 102 is provided in each of the second connection passages 100, and is configured to allow only flow of the working fluid from the small diameter portion 84 to the first chamber 78. That is, even when the solenoid 92 is being placed in its deenergized state, the working fluid is allowed to flow from the second chamber 80 to the first chamber 78 through the second connection passages 100 each serving as a bypass passage. Further, a flow restrictor 104 is provided in an opening portion of the through-hole 82 which opens toward the second chamber 80. The flow restrictor 104 is configured to apply a flow resistance force to the flow of the working fluid between the first and second chambers 78, 80. That is, the flow restrictor 104 serves as a flow resistor.

A free piston 106 is fluid-tightly and slidably fitted inside the second chamber 80 via a seal, so as to avoid leakage of the working fluid into a space between the free piston 106 and the bottom wall of the cylinder housing 70. That is, the space between the free piston 106 and the cylinder housing 70 is an air chamber 108. The second chamber 80 is caused to serve as a reservoir, by causing the air chamber 108 to serve as a buffer chamber.

An accumulator 110 is connected to the first chamber 78. This accumulator 110 has: an accumulator housing 112 that is disposed on an outer wall of the cylinder housing 70; and a bellows 114 that is disposed inside the accumulator housing 112. The working fluid is accommodated between the accumulator housing 112 and the bellows 114. The bellows 114 has: an accordion-like wall portion 116 that is fixed at its upper end portion to a cap portion of the accumulator housing 115; and a plate portion 118 that is fixed to a lower end portion of the accordion-like wall portion 116. The bellows 114 is filled with a gas that is accommodated inside the bellows 114. The plate portion 118 is forced, by an elastic force of the accordion-like wall portion 116, toward a bottom wall of the accumulator housing 112, so as to be normally held in contact with the bottom wall of the accumulator housing 112 and close a passage 120 for communicating between the first chamber 78 and the accumulator 110. However, when a fluid pressure in the first chamber 78 is increased, the accordion-like wall portion 116 of the bellows 114 is caused to contract by the increased fluid pressure, whereby the plate portion 118 is separated from the bottom wall of the accumulator housing 112, thereby allowing the working fluid to flow from the first chamber 78 to the accumulator 110.

Further, a circumferential groove 122 is provided in an inner wall surface of the cylindrical member 62 which is fitted on the end portion of the cylinder housing 70 and which surrounds the projecting portion of the piston rod 74. The circumferential groove 122 is fitted on a circumferential protrusion 124 that is provided on an outer circumferential wall surface of the cylinder housing 70. Owing to such a construction, the cylinder housing 70 and the cylindrical member 62 are rotatable relative to each other and unmovable relative to each other in the axial direction.

As shown in FIGS. 3 and 4, a pair of V-shaped slots 126 each having a V-shape is provided in a cylindrical wall surface of the cylindrical member 62. The V-shaped slots 126 are provided in respective upper and lower portions of the cylindrical wall surface of the cylindrical member 62. The V-shape of each of the V-shaped slots 126 is symmetrical with respect to a plane containing an axis of said cylindrical member 62, and has two forked portions that extend toward the end portion of the cylindrical member 62 to which the shaft portion 50 is fixed. Further, a pair of slots 128 are provided in respective upper and lower portions of a cylindrical wall surface of the cylinder housing 70 that is covered by the cylindrical member 62, and extend in the axial direction of the cylinder housing 70. Each of the slots 128 overlaps with a corresponding one of the V-shaped slots 126 that are provided in the cylindrical member 62, so that the pair of slots 128 and the pair of V-shaped slots 126 cooperate to constitute a pair of holes 130 communicating inside the cylinder housing 70 and outside the cylindrical member 62.

A pair of pins 132 are provided on a housing of the solenoid 92 which is provided in the end portion of the piston rod 74, and radially extend from the housing of the solenoid 92. The pins 132 are introduced in the respective holes 130 such that the pins 132 are moved in the axial direction of the cylinder housing 70 and cylindrical member 62 by relative rotation of the cylinder housing 70 and cylindrical member 62. That is, the cylindrical member 62 serves as a cam while each of the pins 132 serves as a cam follower, such that the relative rotation of the stabilizer bar members 22 causes the pins 132 to be moved in the axial direction and accordingly causes the piston 72 to be moved inside the cylinder housing 70. Thus, in the present stabilizer apparatus 10, owing to the cylindrical member 62 and the pair of pins 132, the relative rotation of the stabilizer bar members 22 is converted into movement of the piston 72 within the cylinder housing 70. The present stabilizer apparatus 10 is provided with a motion converting mechanism that is constituted by the cylindrical member 62 and the pair of pins 132.

Owing to the motion converting mechanism, in a state shown in FIG. 4, i.e., a state in which each of the pins 132 is being positioned in a central portion of a corresponding one of the V-shaped slots 126, the piston 72 is being positioned in a position (hereinafter abbreviated to as "movement end position" where appropriate) which is the closest (within a range through which the piston 72 is movable) to the bottom wall of the cylinder housing 70. The piston 72 is moved in a direction away from the movement end position, when the relative rotation of the stabilizer bar members 22 is caused from this state, irrespective of direction of the relative rotation of the stabilizer bar members 22. That is, where a neutral angular position of each of the stabilizer bar members 22 relative to the other is defined as an angular position (of each of the stabilizer bar members 22 relative to the other) which is established when each pin 132 is being positioned in the central portion of the V-shaped slot 126, the piston 72 is moved in a direction (hereinafter referred to as "movement-end-position away direction" where appropriate) which is away from the movement end position and which is toward the cap portion 76 of the cylinder housing 70 when each of the stabilizer bar members 22 is rotated relative to the other in a direction (hereinafter referred to as "neutral-position away direction" where appropriate) away from the neutral angular position. On the other hand, when each of the stabilizer bar members 22 is rotated relative to the other in a direction (hereinafter referred to as "neutral-position toward direction" where appropriate) toward the neutral angular position, the piston 72 is moved in a direction (hereinafter referred to as "movement-end-position toward direction" where appropriate) which is toward the movement end position and which is toward the bottom wall of the cylinder housing 70.

Owing to the above-described construction, when the solenoid 92, which cooperates with the rod 96 to serve as a flowing-state switching device, is being placed in its deenergized state, the flow of the working fluid between the first and second chambers 78, 80 through the connection passages 90 as a bidirectional-flow allowing passage is inhibited, while only the flow of the working fluid between the first and second chambers 78, 80 through the second connection passages 100 as an unidirectional-flow allowing passage is allowed. That is, when the solenoid 92 is being placed in its deenergized state, owing to the check valve 102 provided in each of the second connection passages 100, the working fluid is allowed to flow from the second chamber 80 to the first chamber 78 and is inhibited from flowing from the first chamber 78 to the second chamber 80, so that the piston 72 is allowed to be moved in the movement-end-position toward direction, i.e., in the direction toward the bottom wall of the cylinder housing 70 and is inhibited from being moved in the movement-end-position away direction, i.e., in the direction toward the cap portion 76 of the cylinder housing 70. That is, when the solenoid 92 is being placed in its deenergized state, the unidirectional-movement allowance state is being established to allow the piston 72 to be moved only in the movement-end-position toward direction whereby the relative rotation of the stabilizer bar members 22 in the neutral-position toward direction is allowed while the relative rotation of the stabilizer bar members 22 in the neutral-position away direction is inhibited.

When the solenoid 92, which cooperates with the rod 96 to serve as the closing/opening valve, is being placed in its deenergized state, with each of the stabilizer bar members 22 being not positioned in the neutral angular position relative to the other, at least one of the stabilizer bar members 22 is rotated in the neutral-position toward direction, for example, upon application of an external force to at least one of the stabilizer bar members 22. Then, as a result of the relative rotation of the stabilizer bar members 22 in the neutral-position toward direction, each of the stabilizer bar members 22 is positioned in the neutral angular position relative to the other, whereby the working fluid is inhibited from flowing between the first and second chambers 78, 80 through the second connection passages 100 so that each of the stabilizer bar members 22 is inhibited from being rotated relative to the other in both opposite directions. That is, in a state in which each of the stabilizer bar members 22 is being placed in the neutral angular position relative to the other, the present stabilizer apparatus 10 serves as a stabilizer.

In the present stabilizer apparatus 10, the neutral angular position is an angular position of each of the torsion bar members 22 relative to the other when the vehicle is stationary on a flat road. That is, the neutral angular position is a relative angular position of the stabilizer bar members 22, which is established when the arm portions 52 of the respective stabilizer bar members 22 are parallel to each other as seen from a lateral side of the vehicle. It is noted that each of FIGS. 1 through 5 shows a state in which each of the stabilizer bar members 22 is being positioned in the neutral angular position relative to the other and in which a volume of the first chamber 72 as a fluid chamber is maximized as shown in FIG. 5.

On the other hand, when the solenoid 92 is being placed in its energized state, the flow of the working fluid between the first and second chambers 78, 80 through the connection passages 90 is also allowed whereby the inflow and outflow of the working fluid into and from the first chamber 78 as the fluid chamber are allowed. Therefore, when the solenoid 92 is being placed in its energized state, the bidirectional-movement allowance state is being established to allow the piston 72 to be moved in both opposite directions whereby the relative rotation of the stabilizer bar members 22 in both opposite directions is allowed so that the present stabilizer apparatus 10 does not serve as the stabilizer. Thus, by switching the movement allowance state of the piston 72 between the unidirectional-movement allowance state and the bidirectional-movement allowance state, the stabilizer apparatus 10 is placed in a selected one of a state in which the apparatus 10 serves as the stabilizer and another state in which the apparatus 10 does not serve as the stabilizer. Thus, the present stabilizer apparatus 10 is provided with a movement-allowance-state switching mechanism that is constituted by at least the through-hole 82, connection passages 90, solenoid 92, second connection passages 100 and check valve 102.

It is possible to effectively restrain roll of the vehicle body by a torsional reaction force, which is generated by the pair of stabilizer bar members 22 in a state in which the relative rotation of the stabilizer bar members 22 is being inhibited. However, the torsional reaction force by the pair of stabilizer bar members 22 is not required, for example, when the vehicle is running straight. Rather, when the vehicle is running on a poor-conditioned road, for example, there is a risk that a ride comfort could be made worse by the torsional reaction force. In the present stabilizer apparatus 10, when the vehicle is running straight or running on a poor-conditioned road, for example, it is possible to cause the apparatus 10 to not serve as the stabilizer, by allowing the working fluid to flow between the first and second chambers 78, 80 with placement of the solenoid 92 in its energized state. Further, as described above, the flow restrictor 104 is provided in the through-hole 82 as the communication passage of the working fluid, so as to apply a flow resistance force to flow of the working fluid through the through-hole 82. Thus, owing to the resistance applied to the flow of the working fluid, a rotation resistance force is generated to act against the relative rotation of the stabilizer bar members 22, and the generated rotation resistance force acts as a damping force against roll vibration of the vehicle body. Therefore, the present stabilizer apparatus 10 exhibits a function of damping the roll vibration.

On the other hand, when the vehicle is being turning, it is preferable to inhibit the relative rotation of the stabilizer bar members 22 so as to cause the stabilizer apparatus 10 to function as the stabilizer. The pair of torsion bar members 22 are designed such that the stabilizer bar 20 exhibits a predetermined stiffness in a reference state in which each of the stabilizer bar members 22 is being positioned in the neutral angular position relative to the other, namely, in which an amount of relative rotation of the stabilizer bar members 22 is zero. Therefore, when the relative rotation of the stabilizer bar members 22 is inhibited in a state in which each of the stabilizer bar members 22 is not being positioned in the neutral angular position relative to the other, the stiffness exhibited by the stabilizer bar 20 is different from the predetermined stiffness. In view of this, it is preferable to inhibit the relative rotation when each of the stabilizer bar members 22 is being positioned in the neutral angular position relative to the other. In the present stabilizer apparatus 10, even if the solenoid 92 is placed in its deenergized state while each of the stabilizer bar members 22 is not being positioned in the neutral angular position relative to the other, at least one of the stabilizer bar members 22 is rotated in the neutral-position toward direction by application of an external force to the stabilizer bar members 22 so that the relative rotation is eventually inhibited when each of the stabilizer bar members 22 is positioned in the neutral angular position relative to the other. Therefore, in the present stabilizer apparatus 10, it is possible to inhibit the relative rotation of the stabilizer bar members 22 only in the state in which each of the stabilizer bar members 22 is being positioned in the neutral angular position relative to the other.

In the state in which the relative rotation of the stabilizer bar members 22 is being inhibited, the torsional reaction force generated by the stabilizer bar members 22 acts as the roll restraining force. In this instance, since the accumulator 110 is connected to the cylinder device 60, a pressure force accumulated in the accumulator 110 also acts as the roll restraining force. That is, a roll stiffness of the present stabilizer apparatus 10 is influenced by not only the stiffness of the pair of stabilizer bar members 22 but also a spring constant of the accumulator 110, so that it is possible to finely adjust the roll stiffness of the stabilizer apparatus 10 by adjusting the spring constant of the accumulator 110.

Second Embodiment

Figure 6:
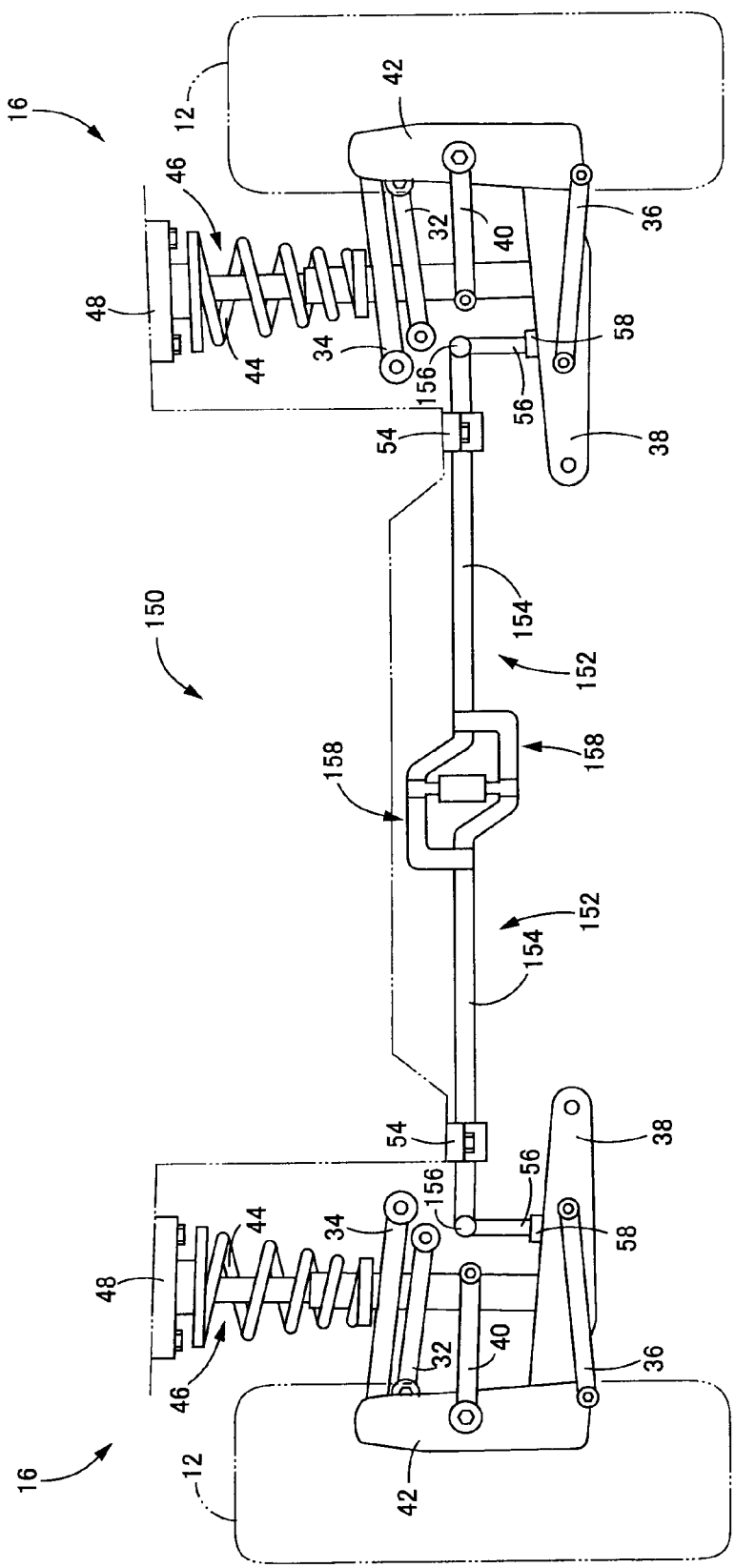
FIG. 6 is a schematic view showing a stabilizer apparatus for a vehicle, which is constructed according to a second embodiment of the claimable invention, as seen from a front side of the vehicle.

FIG. 6 is a schematic view showing a stabilizer apparatus 150 for a vehicle, which is constructed according to a second embodiment of the invention, as seen from a front side of the vehicle. Since the vehicle in which the present stabilizer apparatus 150 is installed is equipped with many constructional elements common to the vehicle in which the stabilizer apparatus 10 of the above-described embodiment is installed, the same reference signs will be used to identify the common constructional elements, and description of these elements will be omitted or simplified in the following description regarding the present apparatus 150.

The present stabilizer apparatus 150 includes a pair of stabilizer bar members 152 connected to the respective two suspension devices 16 that are provided for respective right and left wheels 12 of the vehicle. Each of the stabilizer bar members 152 may be considered to be sectioned into a shaft portion 154, an arm portion 156 and a connecting portion 158. The shaft portion 154 constitutes a main portion of each stabilizer bar member 152, and extends generally in a lateral direction of the vehicle. The arm portion 156 is integrated with an end portion of the shaft portion 154 which is located in a lateral side portion of the vehicle, and extends generally in a forward direction of the vehicle which intersects the shaft portion 154. The connecting portion 158 is integrated with another end portion of the shaft portion 154 which is remote from the arm portion 156, and has a generally lying U-shape.

The shaft portion 154 of each of the stabilizer bar members 152 is rotatably held, at its portion that is close to the arm portion 156, by the retainer 54 that is fixed to the vehicle body, such that the shaft portions 154 of the respective bar members 152 are held coaxial with each other. The arm portion 156 is connected at its end portion (i.e., one of its opposite end portions that is remote from the shaft portion 154) to the second lower arm 38 via the link rod 56, such that the arm portion 156 is rockable relative to the second lower arm 38. On the other hand, the connecting portion 158 of one of the stabilizer bar members 152 is connected at its end portion (i.e., one of its opposite end portions that is remote from the shaft portion 154) to the shaft portion 154 of the other of the stabilizer bar members 152, as described later in detail.

Figure 7:
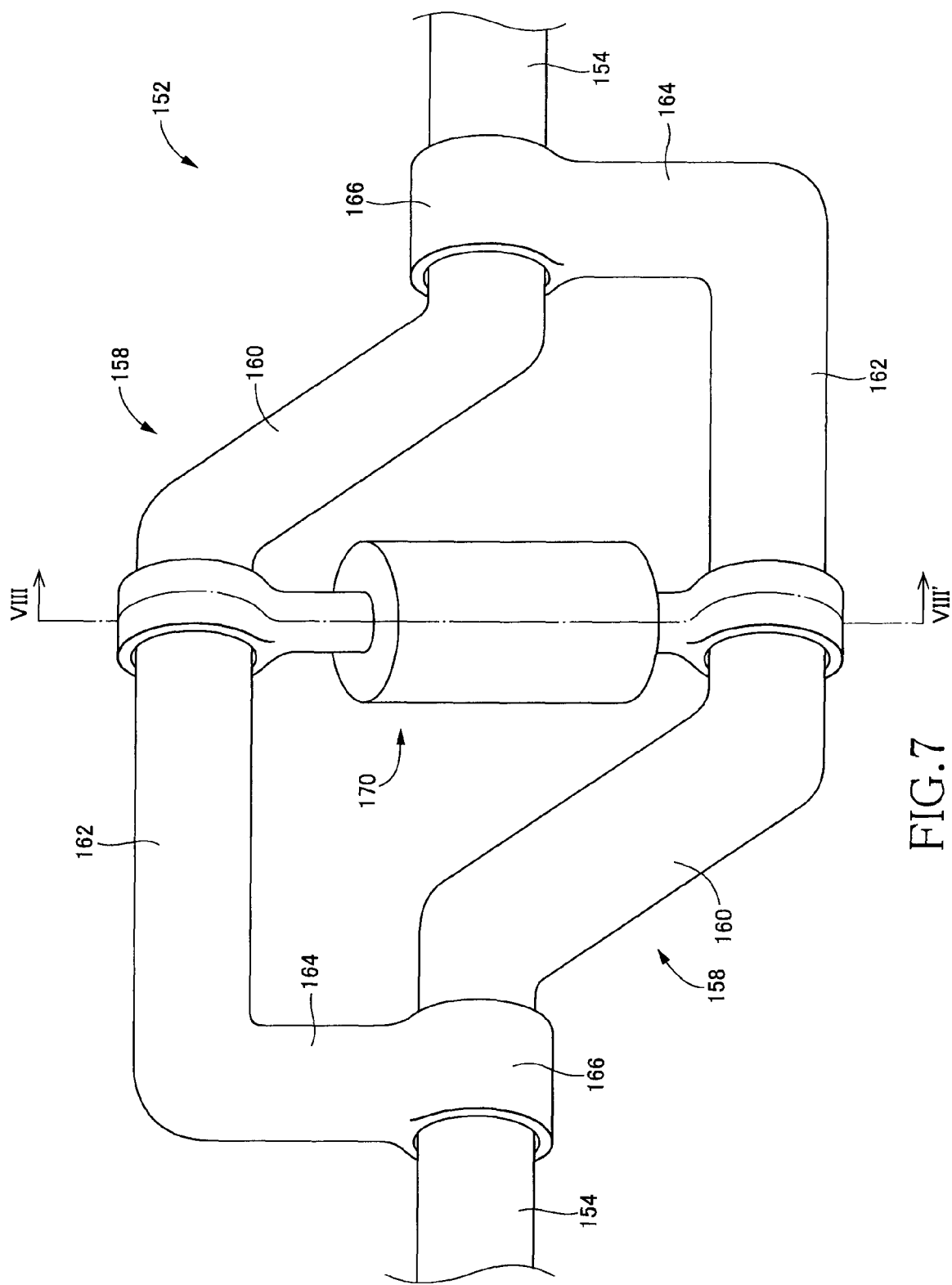
FIG. 7 is a perspective view showing connecting portions of the respective pair of torsion bars which are included in the stabilizer apparatus shown in FIG. 6.

As shown in FIG. 7, the connecting portion 158 of each of the stabilizer bar members 152 may be considered to be sectioned into an extending portion 160, a parallel portion 162 as a radially distant portion and a returning portion 164. The extending portion 160 extends from an end portion of the shaft portion 154 (which is remote from the arm portion 156) in a direction intersecting an axis of the shaft portion 154. The parallel portion 162 extends from an end portion of the extending portion 160 (which is remote from the shaft portion 154) in a direction parallel to the axis of the shaft portion 154. The returning portion 164 extends from an end portion of the parallel portion 162 (which is remote from the extending portion 160) in a direction intersecting the axis of the shaft portion 154. A bushing bearing 166 is provided in an end portion of the returning portion 164 (which is remote from the parallel portion 162), and is rotatably connected to the shaft portion 154 of the other of the stabilizer bar members 152.

Figure 8:
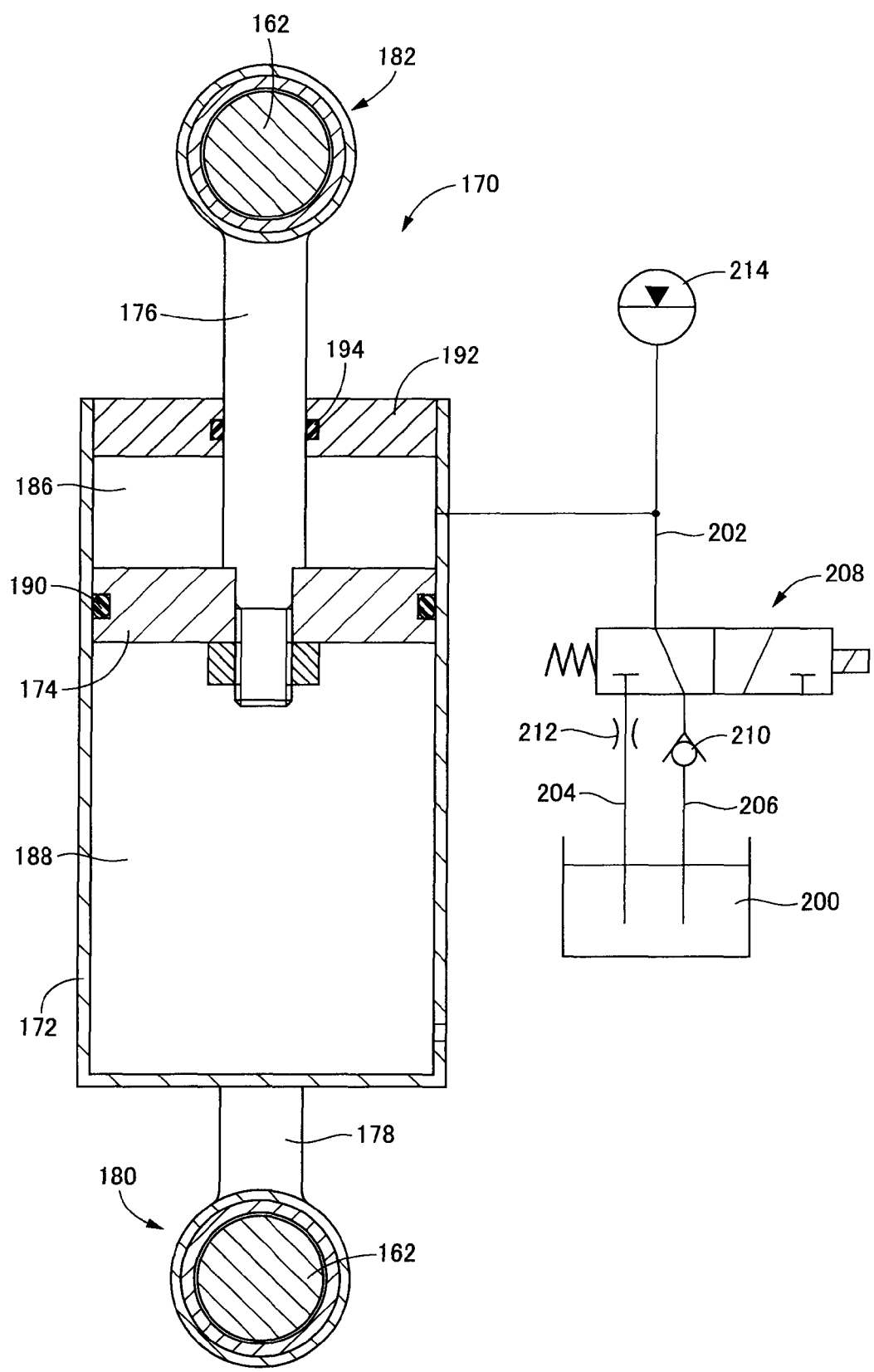
FIG. 8 is a cross sectional view taken along line VIII-VIII' in FIG. 7.

A cylinder device 170 is provided to interconnect the parallel portions 162 of the respective connecting portions 158 of the respective stabilizer bar members 22, so that the connecting portions 158 of the respective stabilizer bar members 22 serve as first and second supporting portions supporting the cylinder device 170. As shown in FIG. 8, the cylinder device 170 is constructed to include: a tubular-shaped cylinder housing 172; a piston 174 that is slidably fitted inside the cylinder housing 172; and a piston rod 176 that includes opposite end portion, one of which is connected to the piston 174 and the other of which constitutes a projecting portion projecting out from an upper end portion of the cylinder housing 172. An attachment rod 178 is fixed to a lower end portion of the cylinder housing 172, and has a lower end portion that is rotatably connected to the parallel portion 162 of a corresponding one of the stabilizer bar members 22 via a bushing bearing 180. On the other hand, an upper end portion of the piston rod 176 is rotatably connected to the parallel portion 162 of the other of the stabilizer bar members 22 via a bushing bearing 182.

Owing to the above-described construction, the shaft portions 154 of the respective stabilizer bar members 152 are coaxially rotatable relative to each other, and the parallel portion 162 of the connecting portion 158 of each of the stabilizer bar members 152 is rotated about the axis of the shaft portion 154 of the stabilizer bar member 152 by rotation of the shaft portion 154 of the stabilizer bar member 152. As a result of rotation of the parallel portion 162, the lower end portion of the attachment rod 178 (which is connected to the parallel portion 162 via the bushing bearing 180) and the upper end portion of the piston rod 176 (which is connected to another parallel portion 162 via the bushing bearing 182) are relatively moved toward or away from each other, whereby the cylinder device 170 is caused to expand or contract. That is, as a result of relative rotation of the shaft portions 154 of the respective stabilizer bar members 152, the cylinder device 170 is caused to expand or contract whereby the piston 174 is moved within the cylinder housing 172. In the present stabilizer apparatus 150, the relative rotation of the shaft portions 154 of the respective stabilizer bar members 152 is converted into the movement of the piston 174 within the cylinder housing 172, for example, by the connecting portions 158 of the respective stabilizer bar members 152. Thus, in the present stabilizer apparatus 150, a motion converting mechanism is constituted by, for example, the connecting portions 158 of the respective stabilizer bar members 152. It is noted that, in the present apparatus 150, the other portions of each stabilizer bar members 152, which are other than the connecting portion 158, such as the shaft portion 154 and arm portion 156, serve as a torsion bar.

By the motion converting mechanism, the cylinder device 170 is being placed in its maximum expansion state in which expansion of the cylinder device 170 is maximized, in a state shown in FIG. 7, i.e., in a state in which the extending portions 160 of the respective stabilizer bar members 152 extend in respective directions which lie on a plane and which are opposite to each other. In this state, the piston 174 is being positioned in a position (hereinafter abbreviated to as "movement end position" where appropriate) which is the closest (within a range through which the piston 174 is movable) to a cap portion 192 of the cylinder housing 172, and a volume of an upper chamber 186 is minimized. The piston 174 is moved downwardly from the movement end position, when the relative rotation of the stabilizer bar members 152 is caused from this state, irrespective of direction of the relative rotation of the stabilizer bar members 152. That is, where a neutral angular position of each of the stabilizer bar members 152 relative to the other is defined as an angular position (of each of the stabilizer bar members 152 relative to the other) which is established when the expansion of the cylinder device 170 is maximized, the piston 174 is moved in a movement-end-position away direction, i.e., in a downward direction when each of the stabilizer bar members 152 is rotated relative to the other in a neutral-position away direction. On the other hand, when each of the stabilizer bar members 152 is rotated relative to the other in a neutral-position toward direction, the piston 174 is moved in a movement-end-position toward direction, i.e., in an upward direction. In the present stabilizer apparatus 150, the neutral angular position is an angular position (of each of the torsion bar members 152 relative to the other) which is established when the vehicle is stationary on a flat road. Each of FIGS. 6 through 8 shows a state in which each of the stabilizer bar members 152 is being positioned in the neutral angular position relative to the other.

An inner space of the cylinder housing 172 is divided by the piston 174, into the upper and lower chambers 186, 188. The upper chamber 186 accommodates therein a working fluid, while the lower chamber 188 serves as an air chamber. A seal 190 is disposed on an outer circumferential surface of the piston 174, for avoiding leakage of the working fluid from the upper chamber 186 to the lower chamber 188. The piston rod 176 pierces through the cap portion 192 that is disposed in the cylinder housing 172, and is in slidable contact with the cap portion 192 via a seal 194.

In the present stabilizer apparatus 150, a reservoir 200 storing the working fluid is disposed outside the cylinder device 170. This reservoir 200 can be in communication with the upper chamber 186 as a fluid chamber through two communication passages. The flow of the working fluid between the reservoir 200 and the upper chamber 186 can be made through one of the two communication passages which is selected by an electromagnetic switching valve. Described in detail, a common passage 202 is connected to the upper chamber 186 while first and second passages 204, 206 are connected to the reservoir 200, such that the common passage 202 is connected to one of the first and second passages 204, 206 which is selected by a switching valve 208.

The first passage 204 serving as a bidirectional-flow allowing passage is configured to allow inflow and outflow of the working fluid into and from the upper chamber 186. When the common passage 202 is connected to the first passage 204 by the switching valve 208 serving as a flowing-state switching device, the inflow and outflow of the working fluid into and from the upper chamber 186 are both allowed through a first communication passage that is constituted by the common passage 202 and the first passage 204, thereby establishing a bidirectional-movement allowance state in which the piston 172 is allowed to be moved in the upward and downward directions. On the other hand, a check valve 210 is provided in the second passage 206, so as to allow the outflow of the working fluid from the upper chamber 186 into the reservoir 200. Thus, the second passage 206 serves as an unidirectional-flow allowing passage that is configured to allow the outflow of the working fluid into the reservoir 200. When the common passage 202 is connected to the second passage 206 by the switching valve 208, only the outflow of the working fluid from the upper chamber 186 into the reservoir 200 is allowed through a second communication passage that is constituted by the common passage 202 and the second passage 204, thereby establishing an unidirectional-movement allowance state in which the piston 172 is allowed to be moved only in the upward direction. Thus, the movement allowance state of the piston 72 is switched between the unidirectional-movement allowance state and the bidirectional-movement allowance state, by the switching valve 208 serving as a communication-passage switching valve that is configured to switch between the first and second communication passages. Thus, the present stabilizer apparatus 150 is provided with a movement-allowance-state switching mechanism that is constituted by the common passage 202, first passage 204, second passage 206, switching valve 208 and check valve 210. It is noted that the switching valve 208 is configured, when being placed in its deenergized state, to interconnect the common passage 202 and the second passage 206, and is configured, when being placed in its energized state, to interconnect the common passage 202 and the first passage 204.

Owing to the above-described construction, when the switching valve 208 is being placed in its energized state, the bidirectional-movement allowance state is being established to allow the piston 174 to be moved in both opposite directions whereby the relative rotation of the stabilizer bar members 152 in both opposite directions is allowed so that the present stabilizer apparatus 150 does not serve as the stabilizer. Therefore, in the present stabilizer apparatus 150, too, when the vehicle is running straight or running on a poor-conditioned road, for example, it is possible to cause the apparatus 150 to not serve as the stabilizer, by allowing the working fluid to flow between the upper chamber 186 and the reservoir 200 with placement of the switching valve 208 in its energized state. Further, a flow restrictor 212 is provided in the first passage 204, so as to apply a flow resistance force to flow of the working fluid through the first passage 204. Therefore, like the above-described apparatus 10, the present apparatus 150 exhibits a function of damping the roll vibration.

On the other hand, when each of the stabilizer bar members 152 is not being positioned in the neutral angular position relative to the other with the switching valve 208 being placed in its deenergized state, at least one of the stabilizer bar members 152 is rotated in the neutral-position toward direction, for example, upon application of an external force to at least one of the stabilizer bar members 22. Then, as a result of the relative rotation of the stabilizer bar members 152 in the neutral-position toward direction, each of the stabilizer bar members 152 is positioned in the neutral angular position relative to the other, whereby the working fluid is inhibited from flowing between the upper chamber 186 and the reservoir 200 through the common passage 202 and the second passage 206 so that each of the stabilizer bar members 152 is inhibited from being rotated relative to the other. Therefore, like in the above-described apparatus 10, in the present stabilizer apparatus 150, it is possible to inhibit the relative rotation of the stabilizer bar members 152 only in the state in which each of the stabilizer bar members 152 is being positioned in the neutral angular position relative to the other. It is noted that the common passage 202 is provided with an accumulator 214, which is configured to apply a spring force to movement of the piston 174 in the state in which the relative rotation of the stabilizer bar members 152 is inhibited.

Modification of Second Embodiment

Figure 9:
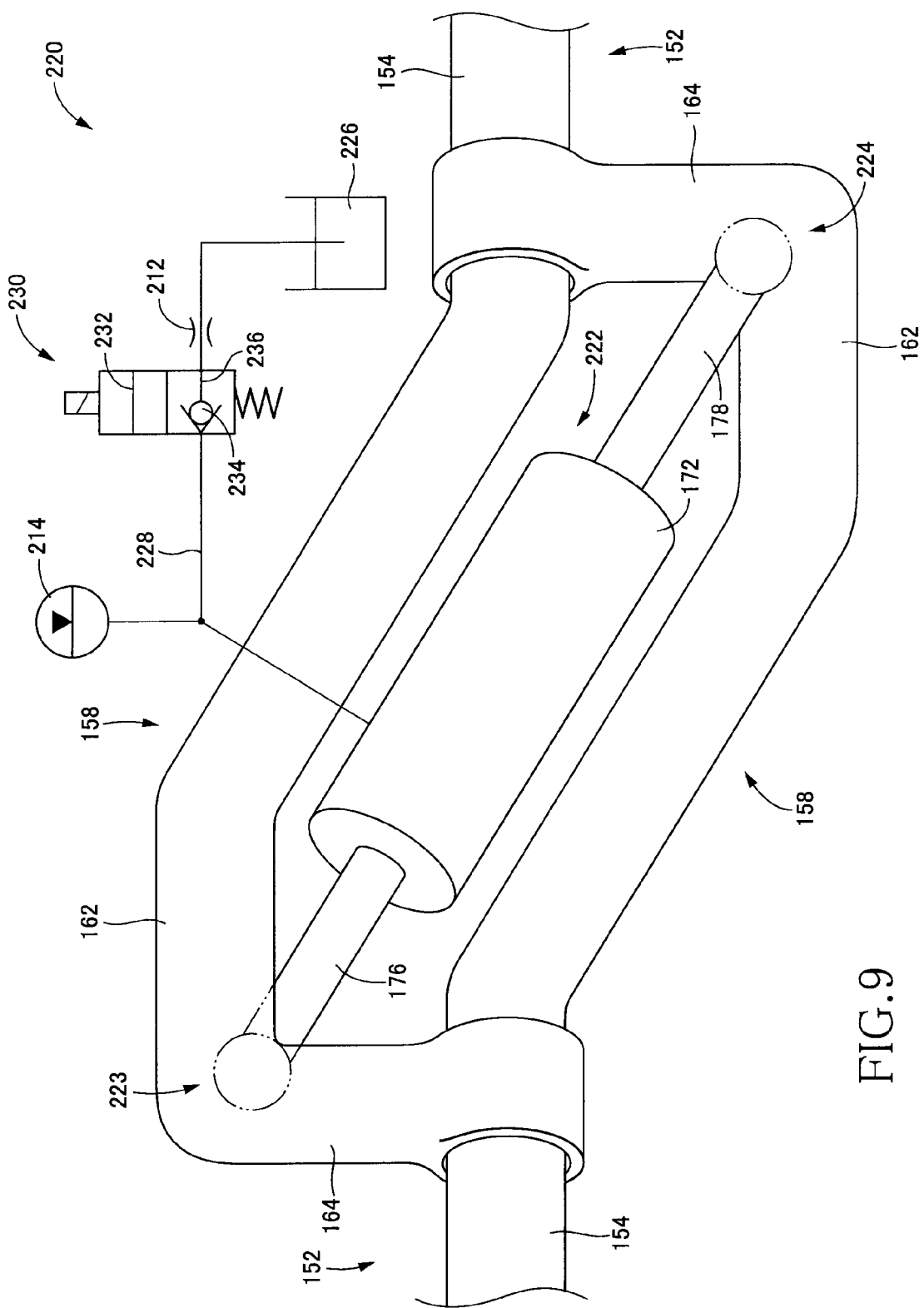
FIG. 9 is a perspective view showing connecting portions of the respective pair of torsion bars which are included in a stabilizer apparatus constructed according to a modification of the second embodiment.

In the above-described stabilizer apparatus 150, the cylinder device 170 is disposed to extend in a direction parallel to a radial direction of the shaft portion 154 of each stabilizer bar member 152. However, the cylinder device may be disposed to extend in a direction that is inclined with respect to the radial direction of the shaft portion. FIG. 9 is an enlarged view showing a modification in the form of a stabilizer apparatus 220 provided with a cylinder device that is disposed to extend in the inclined direction. Since the stabilizer apparatus 220 is substantially identical in construction with the above-described stabilizer apparatus 150 except for construction of the movement-allowance-state switching mechanism and manner of disposition of the cylinder device, only the cylinder device and the movement-allowance-state switching mechanism of the stabilizer apparatus 220 are shown in FIG. 9, without an overall construction of the apparatus 220 being shown. Further, the same reference signs will be used to identify the constructional elements having the same functions as those of the above-described apparatus 150, and description of these elements will be omitted or simplified in the following description regarding the apparatus 220.

In the stabilizer apparatus 220 constructed according to the modification, a cylinder device 222 having substantially the same construction as the cylinder device 170 provided in the above-described apparatus 150, is connected to an end portion of the parallel portion 162 (which is close to the returning portion 164) of one of the stabilizer bar members 152 and to an end portion of the parallel portion 162 of the other of the stabilizer bar members 152. In other words, the cylinder device 170 is connected to an end portion of the returning portion 164 (which is close to the parallel portion 162) of one of the stabilizer bar members 152 and to an end portion of the returning portion 164 of the other of the stabilizer bar members 152. Described in detail, an upper end portion of the piston rod 176 projecting out from an upper end portion of the cylinder housing 172 is connected, via a ball joint 223, to the end portion of the parallel portion 162 as a radially distant portion of one of the stabilizer bar members 152, such that the piston rod 176 is pivotable relative to the parallel portion 162 of the one of the stabilizer bar members 152. Meanwhile, a lower end portion of the attachment rod 178 fixed to a lower end portion of the cylinder housing 172 is connected, via a ball joint 224, to the end portion of the parallel portion 162 of the other of the stabilizer bar members 152, such that the attachment rod 178 is pivotable relative to the parallel portion 162 of the other of the stabilizer bar members 152.

The stabilizer apparatus 220 constructed according to the modification is provided with a reservoir 226, a communication passage 228 and a flowing-state switching valve (hereinafter abbreviated to as "switching valve" where appropriate) 230. The reservoir 226 is provided to store therein the working fluid. The communication passage 228 is provided to communicate between the reservoir 226 and an upper chamber (not shown) defined in the cylinder device 222. The switching valve 230 is provided to switch the flowing state of the communication passage 228. The communication passage 228 and the switching valve 230 cooperate with each other to constitute a movement-allowance-state switching mechanism. The switching valve 230, which serves as a flowing-state switching device, defines therein a bidirectional-flow allowing passage 232 and an unidirectional-flow allowing passage 236, such that the bidirectional-flow allowing passage 232 allows the working fluid to flow between the upper chamber and the reservoir 226 and such that the unidirectional-flow allowing passage 236 is provided with a check valve 234 that is configured to allow only outflow of the working fluid through the passage 236 from the upper chamber to the reservoir 226. The switching valve 230 is configured to switch between a state that allows the working fluid to flow between the upper chamber and the reservoir 226 and a state that allows only the outflow of the working fluid from the upper chamber to the reservoir 226, by selecting one of the passages 232, 236.

Owing to the above-described construction, in the present stabilizer apparatus 220, too, it is possible to cause the apparatus 220 to not serve as a stabilizer by allowing the working fluid to flow between the upper chamber and the reservoir 226. Further, each of the stabilizer bar members 152 is being placed in the neutral angular position relative to the other of the stabilizer bar members 152, with a volume of the upper chamber 222 being minimized, in a state shown in FIG. 9, i.e., in a state in which a portion of the connecting portion 158 of one of the stabilizer bar members 152 and a portion of the connecting portion 158 of the other of the stabilizer bar members 152, which support one and the other of opposite end portions of the cylinder device 222, respectively, lie on a plane containing the axes of the shaft portions 154. Therefore, in the present stabilizer apparatus 220, too, by allowing only the outflow of the working fluid from the upper chamber to the reservoir 226, it is possible to cause the apparatus 220 to serve as the stabilizer only in the state in which each of the stabilizer bar members 152 is being positioned in the neutral angular position relative to the other.

What is claimed is:
1. A stabilizer apparatus for a vehicle, comprising:
(a) a pair of torsion bars each of which is held by a body of the vehicle and is rotatable about an axis thereof, each of said torsion bars being provided for a corresponding one of right and left wheels and extending generally in a lateral direction of the vehicle, each of said torsion bars including a distal end portion connected to a wheel holding portion that holds a corresponding one of the right and left wheels, said torsion bars being configured to serve as a stabilizer bar in a state in which relative rotation of each of said torsion bars relative to the other of said torsion bars is inhibited;
(b) a cylinder device including a cylinder housing and a piston which is disposed inside said cylinder housing and is movable in an axial direction of said cylinder housing, said cylinder housing and said piston cooperating with each other to define a fluid chamber which accommodates therein a working fluid and which has a volume that is to be changed by movement of said piston inside said cylinder housing;
(c) a motion converting mechanism configured to convert the relative rotation of each of said torsion bars into the movement of said piston inside said cylinder housing, and to hold said piston in a movement end position in the axial direction when each of said torsion bars is being positioned in a neutral angular position relative to the other of said torsion bars, said motion converting mechanism being configured to convert the relative rotation of each of said torsion bars in a direction away from the neutral angular position, into the movement of said piston in a direction away from the movement end position, and to convert the relative rotation of each of said torsion bars in a direction toward the neutral angular position, into the movement of said piston in a direction toward the movement end position;
(d) a reservoir held in communication with said fluid chamber and storing therein the working fluid; and
(e) a movement-allowance-state switching mechanism configured to switch between a bidirectional-movement allowance state in which said piston is allowed to be moved in opposite directions consisting of the direction toward the movement end position and the direction away from the movement end position and a unidirectional-movement allowance state in which said piston is allowed to be moved only in the direction toward the movement end position, the bidirectional-movement allowance state being established by allowing both of outflow of the working fluid from said fluid chamber to said reservoir and inflow of the working fluid from said reservoir to said fluid chamber, the unidirectional-movement allowance state being established by allowing only one of the outflow of the working fluid from said fluid chamber to said reservoir and the inflow of the working fluid from said reservoir to said fluid chamber,
wherein each of said torsion bars is allowed to be rotated relative to the other of said torsion bars in the direction toward the neutral angular position and in the direction away from the neutral angular position when the bidirectional-movement allowance state is being established, and is allowed to be rotated relative to the other of said torsion bars only in the direction toward the neutral angular position when the unidirectional-movement allowance state is being established.

2. The stabilizer apparatus according to claim 1,
wherein said motion converting mechanism is configured to maximize the volume of said fluid chamber when said piston is being positioned in the movement end position,
and wherein said movement-allowance-state switching mechanism is configured to allow only the inflow of the working fluid from said reservoir to said fluid chamber when the unidirectional-movement allowance state is being established by said movement-allowance-state switching mechanism.

3. The stabilizer apparatus according to claim 1,
wherein said motion converting mechanism is configured to minimize the volume of said fluid chamber when said piston is being positioned in the movement end position,
and wherein said movement-allowance-state switching mechanism is configured to allow only the outflow of the working fluid from said fluid chamber to said reservoir when the unidirectional-movement allowance state is being established by said movement-allowance-state switching mechanism.

4. The stabilizer apparatus according to claim 1,
wherein said cylinder housing extends in the lateral direction of the vehicle, and is connected at one of opposite end portions thereof to a proximal end portion of one of said torsion bars such that said cylinder housing is unrotatable relative to said one of said torsion bars,
and wherein said motion converting mechanism includes (c-i) a cam which is connected to the other of said torsion bars such that said cam is to be rotated by rotation of said other of said torsion bars about said axis thereof, and (c-ii) a cam follower which is connected to said piston such that said cam follower is unmovable relative to said piston in the axial direction, said cam follower being configured to follow said cam, such that said cam follower is moved in the axial direction by rotation of said cam, whereby the relative rotation of each of said torsion bars relative to the other of said torsion bars, is converted into the movement of said piston inside said cylinder housing.

5. The stabilizer apparatus according to claim 4,
wherein said motion converting mechanism includes (c-i) a hollow cylindrical member which is fitted to the other of said opposite end portions of said cylinder housing such that said cylindrical member is rotatable and unmovable in the axial direction relative to said cylinder housing, and is connected to a proximal end portion of said other of said torsion bars such that said cylindrical member is unrotatable relative to said other of said torsion bars, said cylindrical member having a slot which is provided in an inner wall surface of said cylindrical member and which has a V-shape that is symmetrical with respect to a plane containing an axis of said cylindrical member, and (c-ii) a pin which is engaged in said slot, said pin being connected to said piston such that said pin is unmovable relative to said piston in the axial direction,
and wherein said cylindrical member serves as said cam while said pin serves as said cam follower.

6. The stabilizer apparatus according to claim 1,
wherein said cylinder device has a piston rod which is connected at one of opposite end portions thereof to said piston and which includes a projecting portion projecting out from one of opposite end portions of said cylinder housing, said projecting portion being provided by the other of said opposite end portions of said piston rod, said cylinder device being caused to expand and contract by movement of said piston inside said cylinder housing,
wherein said motion converting mechanism has (c-A) a first supporting portion which is integrated with a proximal end portion of one of said torsion bars and which includes a radially distant portion that is radially distant from said axis of said one of said torsion bars, said radially distant portion of said first supporting portion supporting the other of said opposite end portions of said cylinder housing such that said cylinder housing is pivotable relative to said first supporting portion and (c-B) a second supporting portion which is integrated with a proximal end portion of the other of said torsion bars and which includes a radially distant portion that is radially distant from said axis of said other of said torsion bars, said radially distant portion of said second supporting portion supporting said other of said opposite end portions of said piston rod such that said piston rod is pivotable relative to said second supporting portion,
and wherein said motion converting mechanism is configured to convert the relative rotation of each of said torsion bars into the movement of said piston inside said cylinder housing, by causing said cylinder device to expand and contract by change of distance between said first and second supporting portions which is caused by the relative rotation of each of said torsion bars, said motion converting mechanism being configured, when each of said torsion bars is being positioned in the neutral angular position relative to the other of said torsion bars, to place said cylinder device in one of a maximum expansion state in which expansion of said cylinder device is maximized and a maximum contraction state in which contraction of said cylinder device is maximized.

7. The stabilizer apparatus according to claim 6,
wherein said torsion bars are rotatable relative to each other about a common axis as said axis,
and wherein said motion converting mechanism is configured, when each of said torsion bars is being positioned in the neutral angular position relative to the other of said torsion bars, to cause said radially distant portion of said first supporting portion and said radially distant portion of said second supporting portion to lie on a plane containing said common axis and to cause said radially distant portion of said first supporting portion and said radially distant portion of said second supporting portion to be positioned in respective opposite sides of said common axis.

8. The stabilizer apparatus according to claim 1, wherein said movement-allowance-state switching mechanism has (e-i) a bidirectional-flow allowing passage configured to allow both of the outflow of the working fluid from said fluid chamber to said reservoir and the inflow of the working fluid from said reservoir to said fluid chamber, (e-ii) a unidirectional-flow allowing passage configured to allow only one of the outflow of the working fluid from said fluid chamber to said reservoir and the inflow of the working fluid from said reservoir to said fluid chamber, and (e-iii) a flowing-state switching device configured to switch between a state in which the working fluid is allowed to flow between said fluid chamber and said reservoir through said bidirectional-flow allowing passage and a state in which the working fluid is allowed to flow between said fluid chamber and said reservoir through said unidirectional-flow allowing passage.

9. The stabilizer apparatus according to claim 1,
wherein said cylinder device has two chambers that are defined by cooperation of said piston with said cylinder housing, and wherein one of said two chambers serves as said fluid chamber while the other of said two chambers serves as said reservoir.

10. The stabilizer apparatus according to claim 1, further comprising an accumulator that is connected to said fluid chamber.

11. The stabilizer apparatus according to claim 1,
wherein said motion converting mechanism has a communication passage configured to communicate between said fluid chamber and said reservoir so as to enable the working fluid to flow therethrough between said fluid chamber and said reservoir,
said stabilizer apparatus further comprising a flow resistor which is disposed in said communication passage and is configured to apply a flow resistance force to flow of the working fluid between said fluid chamber and said reservoir,
said stabilizer apparatus being configured to generate a rotation resistance force acting against the relative rotation of each of said torsion bars relative to the other of said torsion bars, by causing said flow resistor to generate the flow resistance force acting against the flow of the working fluid through said communication passage which is caused by the movement of said piston inside said cylinder housing.

12. The stabilizer apparatus according to claim 1, wherein each of said torsion bars includes (a-1) a shaft portion which extends in the lateral direction of the vehicle and (a-2) an arm portion which is contiguous to said shaft portion and which extends in a direction intersecting said shaft portion, said arm portion being connected at a distal end portion thereof to the wheel holding portion that holds a corresponding one of the right and left wheels.

13. The stabilizer apparatus according to claim 1, wherein each of said torsion bars is being positioned in the neutral angular position relative to the other of said torsion bars when the vehicle is stationary on a flat road without twisting deformation of each of said torsion bars.

* * * * *